(12) United States Patent
Shimomura et al.

(10) Patent No.: US 9,276,770 B2
(45) Date of Patent: Mar. 1, 2016

(54) NETWORK CONNECTING DEVICE AND METHOD

(75) Inventors: Tomoyuki Shimomura, Osaka (JP); Ryuichi Okamoto, Osaka (JP); Masaki Mukai, Hyogo (JP); Masaichi Yano, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 806 days.

(21) Appl. No.: 13/397,677

(22) Filed: Feb. 16, 2012

(65) Prior Publication Data
US 2012/0213125 A1 Aug. 23, 2012

(30) Foreign Application Priority Data

Feb. 17, 2011 (JP) ................................. 2011-031581
Apr. 26, 2011 (JP) ................................. 2011-098752
Jul. 26, 2011 (JP) ................................. 2011-163394

(51) Int. Cl.
*H04L 12/28* (2006.01)
*H04L 12/46* (2006.01)

(52) U.S. Cl.
CPC ................................. *H04L 12/4641* (2013.01)

(58) Field of Classification Search
None
See application file for complete search history.

(56) References Cited

U.S. PATENT DOCUMENTS

| | | | |
|---|---|---|---|
| 8,019,082 B1 | 9/2011 | Wiedmann et al. | |
| 8,724,484 B2 * | 5/2014 | Jones et al. | 370/252 |
| 2003/0204748 A1 | 10/2003 | Chiu | |
| 2004/0133687 A1 | 7/2004 | Yamaguchi et al. | |
| 2005/0111445 A1 * | 5/2005 | Wybenga et al. | 370/389 |
| 2005/0149626 A1 * | 7/2005 | Manchester et al. | 709/220 |
| 2005/0163073 A1 * | 7/2005 | Heller et al. | 370/328 |
| 2006/0193336 A1 * | 8/2006 | Landry et al. | 370/431 |
| 2008/0086546 A1 * | 4/2008 | Lu et al. | 709/220 |
| 2008/0086760 A1 | 4/2008 | Jiang et al. | |
| 2008/0086761 A1 | 4/2008 | Hardy et al. | |
| 2009/0285190 A1 * | 11/2009 | Baron et al. | 370/338 |
| 2009/0323632 A1 * | 12/2009 | Nix | 370/331 |
| 2010/0172343 A1 * | 7/2010 | Crinon et al. | 370/352 |

(Continued)

FOREIGN PATENT DOCUMENTS

JP H06-343082 A 12/1994
JP H09-098167 A 4/1997

(Continued)

OTHER PUBLICATIONS

Tomohiro Asada, "Guide for Understanding Wireless LAN Construction," Network Magazine, Jul. 1, 2005, pp. 94 to 97, vol. 10, No. 7, ASCII Corporation, Tokyo, Japan.

*Primary Examiner* — Duc Duong
(74) *Attorney, Agent, or Firm* — James W. Judge

(57) ABSTRACT

A network connecting device includes: a wired LAN connection detection section that detects connecting of a LAN cable; a profile management section that manages a profile; a profile selection section that selects in sequence at least one profile that indicates wired LAN connection; a network configuration section that sets a network configuration based on the selected profile; a network identification information acquisition section that acquires network identification information; a network determination section that determines whether or not a wired LAN with which a connection is formed by the LAN cable and a network indicated by the profile match each other; and a network connection section that applies the profile when it is determined as a match.

15 Claims, 15 Drawing Sheets

(56) References Cited

U.S. PATENT DOCUMENTS

| | | | |
|---|---|---|---|
| 2010/0195608 A1 | 8/2010 | Ishizu et al. | |
| 2010/0290424 A1 | 11/2010 | Collingrige | |

FOREIGN PATENT DOCUMENTS

| | | |
|---|---|---|
| JP | 2004-094736 A | 3/2004 |
| JP | 2005-051625 A | 2/2005 |
| JP | 2005-176021 A | 6/2005 |
| JP | 2006-0196987 A | 7/2006 |
| JP | 2006-324980 A | 11/2006 |
| JP | 2007-525894 A | 9/2007 |
| JP | 2008-072402 A | 3/2008 |
| JP | 2008-520164 A | 6/2008 |
| JP | 2008-250446 A | 10/2008 |
| JP | 2009-027644 A | 2/2009 |
| JP | 2009-044230 A | 2/2009 |
| JP | 2009-538059 A | 10/2009 |
| JP | 2010-166136 A | 7/2010 |
| WO | WO-2005-029783 A1 | 3/2005 |
| WO | WO-2005-121981 A1 | 12/2005 |
| WO | WO-2006-016553 A1 | 2/2006 |
| WO | WO-2010-086931 A1 | 8/2010 |

\* cited by examiner

FIG. 3

| PROFILE NAME 301 | AUTOMATIC CONNECTION APPROVAL /DISAPPROVAL FLAG 302 | AUTOMATIC CONNECTION PRIORITY LEVEL 303 | NETWORK TYPE 304 | NETWORK DEVICE IDENTIFICATION INFORMATION 305 | NETWORK IDENTIFICATION INFORMATION 306 | AUTHENTICATION /ENCRYPTION INFORMATION 307 | TCP/IP CONFIGURATION INFORMATION 308 | CONNECTING PROCESS INFORMATION 309 |
|---|---|---|---|---|---|---|---|---|
| PROFILE A | USAGE APPROVED | 1 | WLAN | FIRST NETWORK DEVICE | FIRST NETWORK | AUTHENTICATION METHOD: A ENCRYPTION METHOD: AA AUTHENTICATION INFORMATION: AAA | IP ADDRESS: 111.111.111.111 | STARTUP APPLICATION A |
| PROFILE B | USAGE APPROVED | 2 | WWAN | SECOND NETWORK DEVICE | SECOND NETWORK | AUTHENTICATION METHOD: B ENCRYPTION METHOD: BB AUTHENTICATION INFORMATION: BBB | IP ADDRESS: 222.222.222.222 | — |
| PROFILE C | USAGE APPROVED | 3 | WIRED LAN | THIRD NETWORK DEVICE | THIRD NETWORK | — | — | — |
| PROFILE D | USAGE DISAPPROVED | — | WiMAX | FOURTH NETWORK DEVICE | FOURTH NETWORK | AUTHENTICATION METHOD: D ENCRYPTION METHOD: DD AUTHENTICATION INFORMATION: DDD | — | STARTUP APPLICATION D |
| ⋮ | ⋮ | ⋮ | ⋮ | ⋮ | ⋮ | ⋮ | ⋮ | ⋮ |

| PROFILE NAME 301 | PAN-UNFORMED CONNECTION APPROVAL/DISAPPROVAL INFORMATION 701 | PAN (BRIDGE CONNECTION CONFIGURATION) -FORMED CONNECTION APPROVAL/DISAPPROVAL INFORMATION 702 | PAN (BRIDGE CONNECTION APPROVAL /DISAPPROVAL CONFIGURATION) -FORMED CONNECTION APPROVAL /DISAPPROVAL INFORMATION 703 |
|---|---|---|---|
| PROFILE A | CONNECTION APPROVED | CONNECTION DISAPPROVED | CONNECTION DISAPPROVED |
| PROFILE B | CONNECTION APPROVED | CONNECTION APPROVED | CONNECTION DISAPPROVED |
| PROFILE C | CONNECTION APPROVED | CONNECTION APPROVED | CONNECTION APPROVED |
| PROFILE D | CONNECTION APPROVED | CONNECTION APPROVED | CONNECTION APPROVED |
| ... | ... | ... | ... |

FIG. 8

| PROFILE NAME 301 | RE-INPUT NECESSITY INFORMATION (IN THE MANUAL CONNECTION MODE) 801 | RE-INPUT NECESSITY INFORMATION (IN THE AUTOMATIC CONNECTION MODE) 802 |
|---|---|---|
| PROFILE A | UNNECESSARY | NECESSARY |
| PROFILE B | UNNECESSARY | NECESSARY |
| PROFILE C | UNNECESSARY | UNNECESSARY |
| PROFILE D | UNNECESSARY | UNNECESSARY |
| . . . | . . . | . . . |

FIG. 9

| PROFILE NAME 301 | NO-OPERATION-CONTINUATION CONNECTION APPROVAL/DISAPPROVAL INFORMATION 901 |
|---|---|
| PROFILE A | DISAPPROVED |
| PROFILE B | DISAPPROVED |
| PROFILE C | APPROVED |
| PROFILE D | APPROVED |
| ... | ... |

FIG. 11

| PROFILE NAME 301 | AUTOMATIC CONNECTION APPROVAL/ DISAPPROVAL FLAG 302 | AUTOMATIC CONNECTION PRIORITY LEVEL 303 | NETWORK TYPE 304 | NETWORK DEVICE IDENTIFICATION INFORMATION 305 | NETWORK IDENTIFICATION INFORMATION 306 | AUTHENTICATION /ENCRYPTION INFORMATION 307 | TCP/IP CONFIGURATION INFORMATION 308 | CONNECTING PROCESS INFORMATION 309 |
|---|---|---|---|---|---|---|---|---|
| PROFILE A | USAGE APPROVED | 1 | WIRED LAN | FIRST NETWORK DEVICE | FIRST NETWORK | — | IP ADDRESS: 192.168.1.1 SUBNET MASK: 255.255.0.0 DEFAULT GW: 192.168.0.1 | STARTUP APPLICATION W1 DISPLAY SCREEN U1 |
|  |  |  |  |  | MAC ADDRESS: a1111111111 |  |  |  |
| PROFILE B | USAGE APPROVED | 4 | WLAN | SECOND NETWORK DEVICE | SECOND NETWORK | AUTHENTICATION METHOD: X2 ENCRYPTION METHOD: Y2 AUTHENTICATION INFORMATION: Z2 | IP ADDRESS: 192.168.2.2 SUBNET MASK: 255.255.0.0 DEFAULT GW: 192.168.0.2 | STARTUP APPLICATION W2 DISPLAY SCREEN U2 |
|  |  |  |  |  | SSID: b22222 |  |  |  |
| PROFILE C | USAGE APPROVED | 2 | WIRED LAN | THIRD NETWORK DEVICE | THIRD NETWORK | — | IP ADDRESS: 192.168.3.3 SUBNET MASK: 255.255.0.0 DEFAULT GW: 192.168.0.3 | STARTUP APPLICATION W3 DISPLAY SCREEN U3 |
|  |  |  |  |  | MAC ADDRESS: c3333333333 |  |  |  |
| PROFILE D | USAGE APPROVED | 3 | WIRED LAN | FOURTH NETWORK DEVICE | FOURTH NETWORK | — | DHCP | STARTUP APPLICATION W4 DISPLAY SCREEN U4 |
|  |  |  |  |  | MAC ADDRESS: d4444444444 |  |  |  |
| PROFILE E | USAGE DISAPPROVED | — | WiMAX | FIFTH NETWORK DEVICE | FIFTH NETWORK | AUTHENTICATION METHOD: X5 ENCRYPTION METHOD: Y5 AUTHENTICATION INFORMATION: Z5 | IP ADDRESS: 192.168.5.5 SUBNET MASK: 255.255.0.0 DEFAULT GW: 192.168.0.5 | STARTUP APPLICATION W5 |
|  |  |  |  |  | OPERATOR INFORMATION: E555555 |  |  |  |
| ⋮ | ⋮ | ⋮ | ⋮ | ⋮ | ⋮ | ⋮ | ⋮ | ⋮ |

| PROFILE NAME 301 | FIRST NETWORK CONNECTION INFORMATION ||||| SECOND NETWORK CONNECTION INFORMATION |||
|---|---|---|---|---|---|---|---|---|
| | NETWORK TYPE 304 | NETWORK DEVICE IDENTIFICATION INFORMATION 305 | NETWORK IDENTIFICATION INFORMATION 306 | AUTHENTICATION /ENCRYPTION INFORMATION 307 | AUTOMATIC CONNECTION APPROVAL/ DISAPPROVAL FLAG 302 | AUTOMATIC CONNECTION PRIORITY LEVEL 303 | TCP/IP CONFIGURATION INFORMATION 308 | CONNECTING PROCESS INFORMATION 309 |
| PROFILE A | WLAN | FIRST NETWORK DEVICE | FIRST NETWORK | AUTHENTICATION METHOD: X1 ENCRYPTION METHOD: Y1 AUTHENTICATION INFORMATION: Z1 | USAGE APPROVED | 1 | IP ADDRESS: 192.168.1.1 SUBNET MASK: 255.255.0.0 | STARTUP APPLICATION W1 |
| PROFILE B | WWAN | SECOND NETWORK DEVICE | SECOND NETWORK | AUTHENTICATION METHOD: X2 ENCRYPTION METHOD: Y2 AUTHENTICATION INFORMATION: Z2 | USAGE APPROVED | 2 | IP ADDRESS: 192.168.2.2 SUBNET MASK: 255.255.0.0 | STARTUP APPLICATION W2 DISPLAY SCREEN U2 |
| PROFILE C | WIRED LAN | THIRD NETWORK DEVICE | THIRD NETWORK | — | USAGE APPROVED | 3 | IP ADDRESS: 192.168.3.3 SUBNET MASK: 255.255.0.0 | STARTUP APPLICATION W3 DISPLAY SCREEN U3 |
| PROFILE D | WiMAX | FOURTH NETWORK DEVICE | FOURTH NETWORK | AUTHENTICATION METHOD: X4 ENCRYPTION METHOD: Y4 AUTHENTICATION INFORMATION: Z4 | USAGE DISAPPROVED | — | IP ADDRESS: 192.168.4.4 SUBNET MASK: 255.255.0.0 | STARTUP APPLICATION W4 |
| ⋮ | ⋮ | ⋮ | ⋮ | ⋮ | ⋮ | ⋮ | ⋮ | ⋮ |

1500

NETWORK CONNECTING DEVICE AND METHOD

BACKGROUND OF THE INVENTION

1. Field of the Invention

The present invention relates to terminal devices connectable to networks including, for example, WWAN (Wireless Wide Area Network), WLAN (Wireless Local Area Network), WiMAX (Worldwide Interoperability for Microwave Access), and wired LANs (Local Area Networks), and also relates to network connecting methods.

2. Description of the Background Art

In recent years, associated with the progress in network technologies, various types of networks such as WWAN, WLAN, and WiMAX are becoming available, and terminals connectable to these multiple types of networks are beginning to appear in the market. In such a situation, Patent Literature 1 discloses a computer device connectable to such different types of networks for improving convenience for users.

PATENT LITERATURE

[PTL 1] Japanese Laid-Open Patent Publication (translation of PCT application) No. 2008-520164

However, in conventional art, connecting to a network and switching to a network for connection are automatically conducted simply in accordance with priority levels set by a user. Thus, problems may occur with regard to security depending on the situation. Various problems are conceivable, such as, for example, a case where switching of connection occurs automatically without the knowledge of a user from a trustworthy network such as a company network, a home network, or the like to an untrustworthy network such as a public network or the like.

In addition, when connecting to a wired LAN, for example, unlike connecting to WLAN, there has been a problem where a profile corresponding to the wired LAN intended for connection cannot be easily selected from among a plurality of managed profiles, since a broadcasted message including information such as SSID (Service Set Identifier) for identifying a network is not received. More specifically, when conventional network connecting devices are used to connect to a wired LAN, for example, it has been necessary for the user to confirm the plurality of managed profiles one by one and properly select the profile corresponding to the wired LAN intended for connection.

Furthermore, in conventional art, although there are those that manage configurations regarding different types of networks with a single unified user interface, it is necessary for the user to configure and select the network. However, to have a user configure and select the configurations regarding network connection using a new unified user interface is not convenient for a user who is familiar with functions that are standard to an operating system (OS), and thereby there is a problem where it is not easy for the user to configure and select the correct information regarding the network connection.

SUMMARY OF THE INVENTION

The present invention solves such problems in the conventional art, and provides a network connecting device and connecting method for improving convenience and security in network connections, and improving convenience in configuring a profile of a network connection.

In order to solve the above described conventional problem, the present invention is a network connecting device that connects to a network, and the network connecting device includes: a network device configured to connect to the network; a wired LAN connection detection section configured to detect connecting of a LAN cable to a LAN (Local Area Network) connector; a profile management section configured to manage a profile including information necessary for forming a connection with the network; a profile selection section configured to select, in sequence from among the profiles managed by the profile management section, at least one profile that indicates wired LAN connection, when connecting of the LAN cable to the LAN connector is detected by the wired LAN connection detection section; a network configuration section configured to set, based on the profile selected by the profile selection section, a network configuration corresponding to the profile; a network identification information acquisition section configured to make a request with a network to which the network connecting device is connected by the LAN cable, regarding network identification information for identifying the network, and acquire the network identification information, based on the network configuration set by the network configuration section; a network determination section configured to determine, based on the network identification information acquired by the network identification information acquisition section and information included in the profile selected by the profile selection section, whether a wired LAN with which connection is formed by the LAN cable and a network set by the network configuration section match each other; and a network connection section configured to apply, when the network determination section determines that the wired LAN with which connection is formed by the LAN cable and the network set by the network configuration section match each other, the profile selected by the profile selection section, control the network device based on the profile, and connect to the network.

Furthermore, preferably, the profile includes identification information of a control device for achieving the network connection; the network identification information acquisition section acquires the identification information of the control device for the network to which the network connecting device is connected by the LAN cable, based on the network configuration set by the network configuration section; and the network determination section determines whether the identification information acquired by the network identification information acquisition section and the identification information of the control device included in the profile selected by the profile selection section match each other.

Furthermore, preferably, the identification information of the control device is a MAC (Media Access Control) address.

Furthermore, preferably, the network identification information acquisition section acquires, by using ARP (Address Resolution Protocol), a MAC address of the control device in the network to which the network connecting device is connected by the LAN cable, based on the network configuration set by the network configuration section.

Furthermore, preferably, the control device is a router.

Furthermore, preferably, the control device is a default gateway.

Furthermore, preferably, when the identification information of the control device for achieving the network connection is not set in the profile, the network determination section determines whether an IP (Internet Protocol) address of the network connecting device is within a range acquirable with DHCP (Dynamic Host Configuration Protocol).

Furthermore, preferably, the network identification information acquisition section acquires, by using RIP (Routing Information Protocol), the network identification information for identifying the network.

Furthermore, preferably, from among the at least one profile that indicates the wired LAN connection, the profile selection section selects, in sequence based on a priority level indicating a priority for a search, a profile that indicates wired LAN connection.

Furthermore, preferably, the priority level is set in accordance with at least one of a number of connections and a number of disconnections of a wired LAN connection corresponding to the at least one profile that indicates the wired LAN connection.

Furthermore, preferably, the network identification information acquisition section stops, as a timeout, the acquiring of the network identification information after elapsing of a predetermined time period. In addition, preferably, when it is determined by the network determination section that the wired LAN with which connection is formed by the LAN cable does not match any one of the networks set based on the at least one profile that indicates the wired LAN connection: the profile selection section re-selects in sequence the at least one profile that indicates the wired LAN connection; and the network identification information acquisition section re-acquires the network identification information in accordance with a network configuration that is set based on the re-selected profile, wherein the timeout is implemented after elapsing of a period longer than the predetermined time period.

Furthermore, preferably, the network connecting device further includes: a connection approval/disapproval determination rule management section configured to manage a connection approval/disapproval determination rule which is a rule for determining approval/disapproval of connection to the network using the profile; a connection approval/disapproval determination section configured to determine approval/disapproval of connection to the network using the profile in accordance with the connection approval/disapproval determination rule managed by the connection approval/disapproval determination rule management section; a network connection control section configured to control the connection to the network, make an inquiry with the connection approval/disapproval determination section regarding approval/disapproval of connection to the network using the profile, and instruct the network connection section to connect to the network when a determination result obtained from the connection approval/disapproval determination section is "connection approved;" and a security measure process execution section configured to implement a predetermined security measure process when the predetermined security measure process is necessary for satisfying a condition used by the connection approval/disapproval determination section to determine as "connection approved."

The present invention is also a network connecting method executed, by a computer including a processor, for connecting to a network, and the method includes: a wired LAN connection detection step of causing the computer to detect a connection of a LAN cable to a LAN connector; a profile selection step of causing the computer to select, in sequence from among profiles included in pre-stored information necessary to form a connection with the network, at least one profile that indicates wired LAN connection; a network configuration step of causing the computer to set, based on the profile selected at the profile selection step, a network configuration corresponding to the profile; a network identification information acquisition step of causing the computer to make a request with a network to which the computer is connected by the LAN cable, regarding network identification information to identify the network, and acquire the network identification information, based on the network configuration set at the network configuration step; a network determination step of causing the computer to determine, based on the network identification information acquired at the network identification information acquisition step and information included in the profile selected at the profile selection step, whether a wired LAN with which connection is formed by the LAN cable and a network set by at the network configuration step match each other; and a network connection step of causing the computer to apply, when the wired LAN with which connection is formed by the LAN cable and the network set at the network configuration step are determined to match each other at the network determination step, the profile selected at the profile selection step, control the network device based on the profile, and connect to the network.

Furthermore, in order to achieve the above described object, respective processes conducted by respective components of the network connecting device of the present invention may be regarded as a network connecting method for providing a series of procedural steps. The method may be provided in a form of a program for causing a computer to execute the series of procedural steps. The program may be recorded on a computer-readable recording medium to be installed on a computer.

The present invention can provide a network connecting device and connecting method for improving convenience and security in network connections and improving convenience in configuring a profile of a network connection.

BRIEF DESCRIPTION OF THE DRAWINGS

FIG. 3 shows one example of a profile list in the first embodiment of the present invention;

FIG. 7 shows one example of a connection approval/disapproval determination rule in the first embodiment of the present invention;

FIG. 8 shows one example of the connection approval/disapproval determination rule in the first embodiment of the present invention;

FIG. 9 shows one example of the connection approval/disapproval determination rule in the first embodiment of the present invention;

FIG. 11 shows one example of a profile list according to the second embodiment of the present invention;

FIG. 15 shows one example of a profile list in the third embodiment of the present invention.

DESCRIPTION OF THE PREFERRED EMBODIMENTS

First Embodiment

A network connecting device according to a first embodiment of the present invention will be described.

Figure 1:
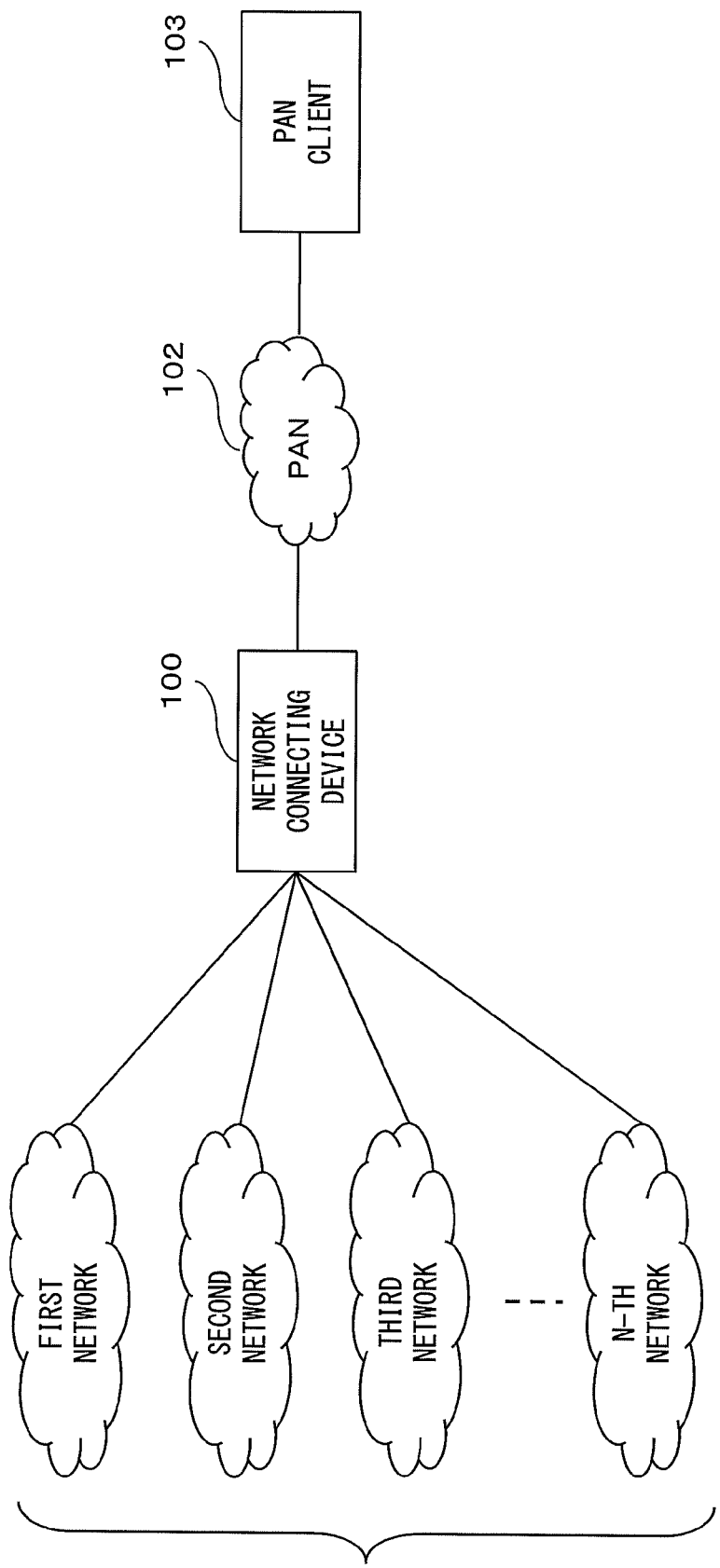
FIG. 1 is for describing an environment in which a network connecting device of each embodiment of the present invention operates.

FIG. 1 is for describing an environment in which a network connecting device 100 of the present embodiment operates. In FIG. 1, the environment in which the network connecting device 100 operates includes at least one network 101, a PAN (Personal Area Network) 102, and a PAN client 103. Description of each component is provided in the following.

The network 101 is a network to which the network connecting device 100 is connectable, and includes, for example, WWAN, WLAN, WiMAX networks, wired LANs, and the like.

The PAN 102 is hosted by the network connecting device 100 so as to be formed, and communicably connects the PAN client 103 and the network connecting device 100. An example of the PAN 102 is a network or the like formed when the network connecting device 100 provides a function as an access point for WLAN, and when the PAN client 103 connects thereto. It should be noted that, the PAN 102 may be formed via peer-to-peer communication between the network connecting device 100 and the PAN client 103, and, in order to achieve that, it is conceivable to use, for example, Wi-Fi (Wireless Fidelity) Direct technology or the like.

The PAN client 103 is a terminal for connecting to the PAN 102, and communicates with the network connecting device 100 via the PAN 102.

The network connecting device 100 may include, for example, a personal computer, a mobile phone, and a Personal Digital Assistant (PDA) having multiple functions.

Figure 2:
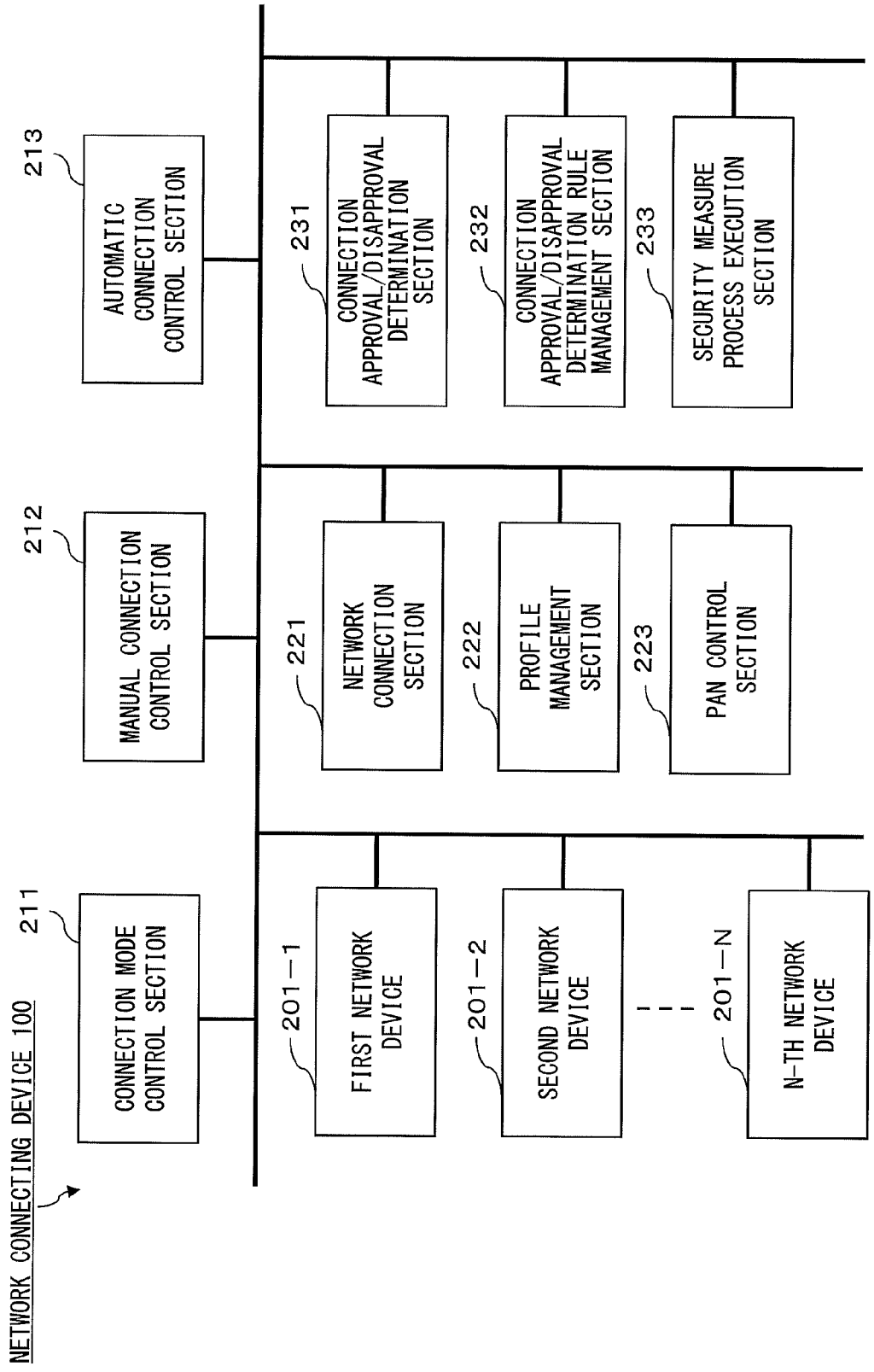
FIG. 2 is a block diagram showing a configuration of a network connecting device according to a first embodiment of the present invention.

Next, by using FIG. 2, the whole configuration of the network connecting device 100 will be described. In FIG. 2, the network connecting device 100 includes one or more network devices 201-1 to 201-N, a connection mode control section 211, a manual connection control section 212, an automatic connection control section 213, a network connection section 221, a profile management section 222, a PAN control section 223, a connection approval/disapproval determination section 231, a connection approval/disapproval determination rule management section 232, and a security measure process execution section 233. Description of each component is provided in the following.

The network devices 201 are devices that each connects to various types of the network 101 and forms the PAN 102. The network devices 201 include, for example, WWAN devices for connecting to WWAN, WLAN devices for connecting to WLAN, WiMAX devices for connecting to WiMAX networks, wired LAN devices for connecting to wired LANs, and WLAN/WiMAX combo devices for connecting to WLAN or WiMAX.

The connection mode control section 211 is a section for controlling switching of connection modes of the network connecting device 100, and conducts switching of connection modes in accordance with an instruction from a user, the status of the network connecting device 100, and the like. As an example in the present embodiment, the connection modes of the network connecting device 100 consist of two modes, a manual connection mode and an automatic connection mode. Conceivable examples of conducting the switching of the connection modes in response to the status of the network connecting device 100 include switching from the automatic connection mode to the manual connection mode when a problem with regard to security may occur when connecting to the network 101 automatically, or when there may be an adverse influence on a process that is being executed on the network connecting device 100 if a process for automatically connecting to the network 101 is conducted. Specifically, the automatic connection mode may be switched to the manual connection mode when the PAN 102 is formed, or the automatic connection mode may be switched to the manual connection mode when a lid on the network connecting device 100 is closed, or the automatic connection mode may be switched to the manual connection mode when a user's no-operation time on the network connecting device 100 becomes equal to or longer than a predetermined time.

The manual connection mode is a mode in which connection and disconnection to/from the network 101 is conducted in accordance with an instruction from the user. The automatic connection mode is a mode in which connection and disconnection to/from the network 101 is automatically conducted in accordance with a predetermined rule described later without an instruction from the user.

The manual connection control section 212 is a section that controls connection and disconnection to/from the network 101 in accordance with an instruction from the user when the connection mode of the network connecting device 100 is in the manual connection mode.

The automatic connection control section 213 is a section that controls automatic connection and disconnection to/from the network 101 in accordance with the later described predetermined rule when the connection mode of the network connecting device 100 is in the automatic connection mode.

The network connection section 221 controls the network devices 201, and acquires various states and information regarding the network 101 such as connection and disconnection to/from the network 101, availability of the network 101, and the like. It should be noted that, the network connection section 221 may be a singular component as shown in FIG. 2, or, for example, there may be a plurality of the network connection sections 221 corresponding to the respective network devices 201.

The profile management section 222 manages a profile which is compiled information of various information and/or other additional information which are necessary when connecting to the network 101. In the present embodiment, the profile management section 222 presents a wizard for generating the profile to the user, and the user creates the profile by performing an input thereon. Furthermore, for example, the user may configure various information regarding the profile by utilizing standard functions included in an OS or by utilizing software and application for setting up network connections. Alternatively, a file having described therein various information may be imported.

The PAN control section 223 controls the network devices 201 and forms or cancels the PAN 102, in accordance with an instruction from the user. When forming the PAN 102, the PAN control section 223 sets configurations for various information such as configurations for an encryption method or an authentication method for connecting to the PAN 102, configurations regarding approval and disapproval of a bridge connection between the PAN 102 and the network 101, or the like. In addition, the PAN control section 223 acquires and manages information regarding the status of connection of the PAN client 103 to the PAN 102, the type of the connected PAN client 103, or the like.

Here, the bridge connection between the PAN 102 and the network 101 refers to a communicably connection between the PAN 102 and the network 101 via the network connecting device 100. When a configuration is set so as to approve bridge connection, the PAN client 103 connected to the PAN 102 is enabled to communicate with the network 101 via the PAN 102 and the network connecting device 100.

The connection approval/disapproval determination section 231 determines approval and disapproval of connection to the network 101 in response to inquiries from the manual connection control section 212 and the automatic connection control section 213. The connection approval/disapproval determination section 231 determines approval/disapproval of connection in accordance with a connection approval/disapproval determination rule managed by the connection approval/disapproval determination rule management section 232.

The connection approval/disapproval determination rule management section 232 manages the connection approval/disapproval determination rule which is a rule that is referred to by the connection approval/disapproval determination section 231 when determining approval/disapproval of connection to the network 101. In the present embodiment, content of the connection approval/disapproval determination rule is configured by the user, and, for example, a condition or the like for connecting to the network 101 is described therein. When the condition is satisfied, the connection approval/disapproval determination section 231 determines that the network 101 is connectable.

As the content of the connection approval/disapproval determination rule, one content is to prevent an occurrence of a security problem when there is a possibility of the occurrence of the security problem upon connecting to the network 101. For example, in a case where the PAN 102 is formed in a state where a configuration approving bridge connection is set, when the network connecting device 100 connects to the network 101, the PAN client 103 connected to the PAN 102 is enabled to communicate with the network 101 by the bridge connection via the PAN 102 and the network connecting device 100.

However, the PAN client 103 is not necessarily given approval to connect to the network 101, and may cause a security problem. Such a problem can be prevented from occurring by configuring the content of the connection approval/disapproval determination rule as, for example, "disapprove connection to the network 101 when the PAN 102 is formed with a configuration approving bridge connection." Specific examples of the connection approval/disapproval determination rule will be described later using FIG. 7 to FIG. 9.

If some sort of security related process is necessary to satisfy the condition described in the connection approval/disapproval determination rule to connect to the network 101, the security measure process execution section 233 executes such a process. For example, when a rule of "have the user re-input authentication information when connecting to the network 101 in the automatic connection mode" is described in the connection approval/disapproval determination rule, the user is notified about the rule and the process of having the user re-input the authentication information is conducted.

Next, a profile list 300 managed by the profile management section 222 will be described. FIG. 3 shows one example of the profile list 300. In FIG. 3, each profile described in the profile list 300 includes a profile name 301, an automatic connection approval/disapproval flag 302, an automatic connection priority level 303, a network type 304, network device identification information 305, network identification information 306, authentication/encryption information 307, TCP/IP configuration information 308, and connecting process information 309. The profile name 301 is the name of a profile. Description of each component is provided in the following.

The automatic connection approval/disapproval flag 302 is information indicating whether or not the profile can be used for the network connection in the automatic connection mode. The automatic connection control section 213 only uses a connection with a profile having the automatic connection approval/disapproval flag 302 configure as "usage approved." The user can exclude, as a candidate, a profile undesired to be used in the automatic connection mode by configuring the value of the automatic connection approval/disapproval flag 302 as "usage disapproved." One implementation example is to set a configuration as "usage disapproved" for a profile for connecting to a network 101 that should raise awareness of the user upon connection, such as a company network, a fee-incurring network, or the like.

The automatic connection priority level 303 is information indicating a priority level for use of the profile when forming a network connection in the automatic connection mode. When forming a network connection, the automatic connection control section 213 uses profiles in a descending order from a profile having a high priority level. In the example in FIG. 3, the automatic connection priority level 303 is configured to be a integer value starting in sequence from "1," and "1" represents the highest priority level and a larger numerical value represents a lower priority level. Although the automatic connection priority levels 303 are arranged in a sequential order of the profile name 301 in the profile list 300, such an arrangement is merely one example and the present invention is not limited thereto. The automatic connection priority level 303 is indicated as "-" when the automatic connection approval/disapproval flag 302 is "usage disapproved;" and "-" means that there is no significant sequential order given to the priority level. Furthermore, the network connecting device 100 may store, as a connection history in storage means such as a memory or the like, information regarding a formed network connection every time a network connection is formed with one among the first to N-th networks, and, by referring to the connection history, may configure the automatic connection priority levels in sequence from a network with which connection has been formed the most, or may configure the automatic connection priority levels in sequence from a network that is least disconnected. Furthermore, the automatic connection priority levels may be configured to be low for a network that has been reconnected without being disconnected. For example, the automatic connection priority levels may be configured in sequence from a network with a low communication cost, or the automatic connection priority levels may be configured in sequence from a network having a fast communication speed. Furthermore, the automatic connection priority levels may be determined comprehensively using a combination of some or all of: trustworthiness, connection history, communication cost, and communication speed of a network connection. For example, it is possible to have the automatic connection priority levels to be configurable or changeable so as to respond to a situation such as when the user wishes to prioritize communication speed over communication cost.

The network type 304 is information indicating the type of the network 101 with which connection is formed using the profile. The type includes "WLAN," "WWAN," "WiMAX," "wired LAN," and the like.

The network device identification information 305 is information that identifies the network device 201 used when forming a network connection using the profile.

The network identification information 306 is information that identifies the network 101 with which connection is formed using the profile. Representatively, the network identification information 306 is a MAC (Media Access Control) address of a control device (e.g., a router and/or a default gateway) in the network in a case with a wired LAN, a SSID (Service Set Identifier) of the network in a case with WLAN, and information or the like identifying an operator of the network in cases with WiMAX and WWAN.

The authentication/encryption information 307 is information related to authentication methods, encryption methods, encryption keys, and the like that are necessary when connecting to the network 101 using the profile. Specifically, for example, with the case with WLAN, conceivable authentication methods include WPA (Wi-Fi Protected Access) personal, WPA enterprise, and the like, and conceivable encryption methods include TKIP (Temporal Key Integrity Protocol), AES (Advanced Encryption Standard), WEP (Wired Equivalent Privacy), and the like.

The TCP/IP configuration information 308 is information such as, for example, an IP address or the like of the network connecting device 100 necessary when forming a network; and the information may include configurations for a subnet mask or a default gateway, configurations for a DNS server address or a WINS address, and the like. When connecting to the network 101, the network connection section 221 changes the TCP/IP configuration of the network connecting device 100 in accordance with the TCP/IP configuration information 308. With this, the TCP/IP configuration is set automatically when connecting to the network 101, and thereby convenience for the user can be improved since it is unnecessary for the user to manipulate the network connection and the TCP/IP configuration, separately.

The connecting process information 309 is information that indicates a process executed when connection is formed with the network 101 using the profile. Examples thereof include starting up a predetermined application using a predetermined option, configuration changes of a default printer, configuration changes of a proxy server, automatic start-up of a VPN (Virtual Private Network), configuration changes of a home page displayed at the startup of a web browser, and the like. The manual connection control section 212 and the automatic connection control section 213 control the network connection section 221, and execute a process described in the connecting process information 309 when connection is formed with the network 101. In the manner described above, as a result of defining the connecting process information 309 for every profile, application start-up or the like is executed in association with achieving of a network connection; and thereby convenience for the user can be improved since it is unnecessary for the user to manipulate the network connection and an application start-up etc., separately. In addition, it is possible to set the configurations in accordance with the network with which the connection is formed, such as setting the configurations so as to automatically start-up an E-mail software when connection is formed with a company network, or setting the configurations so as to automatically start-up a web browser when connection is formed with a home network; and thereby convenience for the user can be improved.

The profile list 300 shown in FIG. 3 is an example in which four profiles of "profile A," "profile B," "profile C," and "profile D" are described as the profile name 301. In FIG. 3, the profiles permitted to be used in the automatic connection mode are "profile A," "profile B," and "profile C;" and with regard to the priority levels used in the automatic connection mode, the highest is "profile A," the second highest is "profile B," and the third highest is "profile C."

Furthermore, with reference to FIG. 3, description is provided using "profile A" as one example; and description is provided in the following for: the type of the network 101, the network device 201, the network 101 with which a connection is formed, the authentication method, the encryption method, the authentication information, and the process that is to be executed. The type of the network 101 with which a connection is formed using "profile A" is "WLAN." The network device 201 used when forming a network connection using "profile A" is "first network device." The network 101 with which a connection is formed using "profile A" is "first network." When connecting to the network 101 using "profile A," the authentication method is "A," the encryption method is "AA," and the authentication information such as a network key or the like is "AAA." "Change IP address to 111.111.111.111" is performed when connecting to the network 101 using "profile A;" and the process executed when connection is formed with the network 101 is "startup application A."

Next, with reference to a flowchart, an action of the network connecting device 100 in the present embodiment will be described.

First, with reference to a flowchart shown in FIG. 4, an operation of a manual connection process of the network connecting device 100 for connecting to the network 101 in the manual connection mode will be described.

Step S401: The manual connection control section 212 receives an instruction to connect to the network 101, which is inputted by the user via an input section such as a keyboard or the like which is not shown. This connection instruction includes information for identifying the profile name 301 of the profile used when connecting to the network 101.

Step S402: The manual connection control section 212 refers to the profile list 300 managed by the profile management section 222, and acquires information of the profile having the profile name 301 received at step S401.

Step S403: The manual connection control section 212 transfers the profile acquired at step S402 to the network connection section 221, and requests the network connection section 221 to conduct a search for the network 101 with which a connection is to be formed using the profile. By using the network device 201 identified by the network device identification information 305 included in the profile that has been received, the network connection section 221 searches for the network 101 identified by the network identification information 306, and determines whether the network 101 identified by the network identification information 306 is usable. The decision of whether or not it is usable is determined based on whether the network 101 is inside or outside a connectable area, or whether a contract for usage is valid, etc. In the present embodiment, searching for the network 101 and the determination of usability are conducted in the present step; however, the present invention is not limited thereto. For example, searching for the network 101 corresponding to each profile and the determination of usability may be conducted in advance at a predetermined timing such as at the startup of the network connecting device 100, or may be repeatedly conducted at a constant interval, and, at the present step, only a confirmation of that result may be conducted. Furthermore, the determination result of usability conducted in advance may be presented to the user using a GUI (Graphical User Interface) or the like. Still further, for example, a connection instruction from a network 101 that has been determined unusable may be prevented from being received at step S401.

Step S404: When the determination result is "unusable," the network connection section 221 notifies the reason behind that to the manual connection control section 212. When the determination result is "usable," the manual connection control section 212 transfers, to the connection approval/disapproval determination section 231, the profile name 301 of the profile acquired at S402, and instructs to conduct, by using that as a candidate, a later described connection approval/disapproval determination process (S405). When the determination result is "unusable," the manual connection control section 212 notifies, through an output section such as a display or the like which is not shown, that the network 101 instructed by the user for connection is unusable and the reason thereof, and the process ends.

Figure 6:
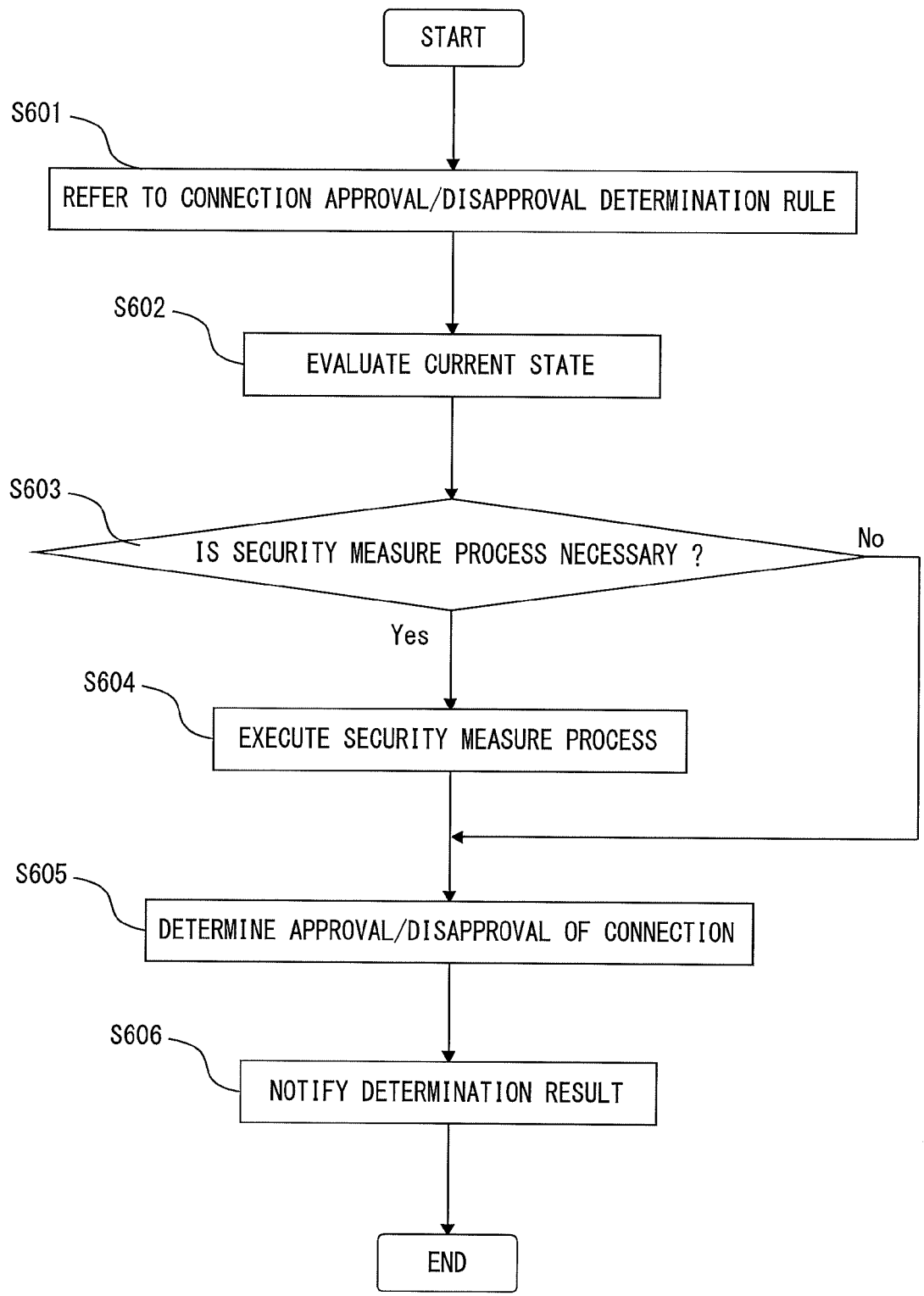
FIG. 6 is a flowchart showing a connection approval/disapproval determination process in the first embodiment of the present invention.

Step S405: The connection approval/disapproval determination process described later using FIG. 6 is conducted.

Step S406: The manual connection control section 212 receives, from the connection approval/disapproval determination section 231, the determination result of the connection approval/disapproval determination process at step S405, and, if the determination result is "connection disapproved," the reason thereof. When it is determined as "connection approved" as a result of the connection approval/disapproval determination process at step S405, the manual connection control section 212 transfers the profile acquired at step S402 to the network connection section 221, and instructs the network connection section 221 to connect to the network 101. When it is determined as "connection disapproved" as a result of the connection approval/disapproval determination process at step S405, the manual connection control section 212 notifies, through the output section such as a display or the like which is not shown, that the network 101 instructed by the user for connection is unusable and the reason thereof, and the process ends.

Step S407: The network connection section 221 changes the TCP/IP configuration of the network devices 201 identified by the network device identification information 305, in accordance with the TCP/IP configuration information 308 of the profile received at step S406. The network connection section 221 connects to the network 101 identified by the network identification information 306, using the network devices 201 identified by the network device identification information 305 included in the profile received at step S406. The network connection section 221 uses, as information regarding authentication/encryption necessary for connecting to the network 101, the content described in the authentication/encryption information 307 included in the profile received at step S406. When the authentication/encryption information 307 is blank, or when additional information is necessary, an inquiry is made with the user to acquire information. Furthermore, when the network connecting device 100 is already in a connected state with another network 101 that is different from the network 101 intended for connection at step S407, the network connection section 221 disconnects the other network 101 with which the connected state has been formed.

The manual connection control section 212 refers to the connecting process information 309 of the profile acquired at step S402, and executes the process described therein.

It has been described above that, when the determination result is "unusable" at step S403 described above, the result and the reason thereof will be notified; however, this is conducted for the convenience of a user who would want to know the reason when receiving such a notification, and the notification of the reason may be omitted.

Next, with reference to a flowchart shown in FIG. 5, an operation of an automatic connection process of the network connecting device 100 for automatically connecting to the network 101 in the automatic connection mode will be described.

Step S501: The automatic connection control section 213 detects an event that becomes a trigger for initiating a connection process to the network 101 at step S502 and beyond. This event is generated at a predetermined timing, and, for example, may be generated periodically once in every predetermined period by a timer that is not shown, or may be generated at a timing when the network connecting device 100 returns from a startup state, an idle state, or the like, or when the network connecting device 100 transitions to a predetermined state such as at a timing when the connection status of the network 101 changes.

Step S502: The automatic connection control section 213 refers to the automatic connection priority level 303 of the profile list 300, and initiates a process for a profile having the highest priority level. In the present embodiment, since a profile having a value "1" of the automatic connection priority level 303 has the highest priority level, K ($1 \leq K \leq N$, wherein, N is the number of profiles) representing the priority level is set as K=1, and the process advances to step S503.

Step S503: The automatic connection control section 213 refers to the profile list 300 managed by the profile management section 222, and acquires information of the profile whose value of the automatic connection priority level 303 is "K."

Step S504: The automatic connection control section 213 transfers the profile acquired at S503 to the network connection section 221, and makes an inquiry regarding whether or not connection has been already formed with the network 101 with which a connection is to be formed using the profile. By using the network device 201 identified by the network device identification information 305 included in the profile that has been received, the network connection section 221 determines that connection has been already formed with the network 101 identified by the network identification information 306. The network connection section 221 notifies the determination result to the automatic connection control section 213. When the determination result is "connection already formed," the automatic connection control section 213 determines that connection has been already formed with the network 101, and simply ends the process. When the determination result is "connection not formed," the automatic connection control section 213 advances the process to step S505.

Step S505: The automatic connection control section 213 transfers the profile acquired at step S503 to the network connection section 221, and request the network connection section 221 to conduct a search for the network 101 with which a connection is to be formed using the profile. By using the network devices 201 identified by the network device identification information 305 included in the profile that has been received, the network connection section 221 searches for the network 101 identified by the network identification information 306, and determines whether it is usable. The decision of whether or not it is usable or unusable is determined based on whether the network 101 is inside or outside a connectable area, or whether a contract for usage is valid, etc. In the present embodiment, searching for the network 101 and the determination of usability are conducted in the present step; however, the present invention is not limited thereto. For example, searching for the network 101 corresponding to each profile and the determination of usability may be conducted in advance at a predetermined timing such as at the startup of the network connecting device 100, or may be repeatedly conducted at a constant interval, and, at the present step, only a confirmation of that result may be conducted.

Step S506: When the determination result is "unusable," the network connection section 221 notifies the reason thereof to the automatic connection control section 213. When the determination result received from the network connection section 221 is "usable," the automatic connection control section 213 transfers the profile name 301 of the profile acquired at step S503 to the connection approval/disapproval determination section 231, and instructs to conduct, by using the acquired profile as a candidate, a later described connection approval/disapproval determination process (step S507). When the determination result received from the network connection section 221 is "unusable," the automatic connection control section 213 advances the process to S510.

Step S507: The connection approval/disapproval determination process which is described later using FIG. 6 is conducted.

Step S508: The automatic connection control section 213 receives, from the connection approval/disapproval determination section 231, the determination result of the connection approval/disapproval determination process at step S507, and, if the determination result is "connection disapproved," the reason thereof. When it is determined as "connection approved" as a result of the connection approval/disapproval determination process at step S507, the automatic connection control section 213 transfers the profile acquired at step S503 to the network connection section 221, and instructs the network connection section 221 to connect to the network 101. When it is determined as "connection disapproved" as a result of the connection approval/disapproval determination process at step S507, the automatic connection control section 213 advances the process to step S510.

Step S509: The network connection section 221 changes the TCP/IP configuration of the network devices 201 identified by the network device identification information 305, in accordance with the TCP/IP configuration information 308 of the profile received at step S508. The network connection section 221 connects to the network 101 identified by the network identification information 306, using the network devices 201 identified by the network device identification information 305 included in the profile received at step S508. The network connection section 221 uses, as information regarding authentication/encryption necessary for connection, the content described in the authentication/encryption information 307 included in the profile received at step S508. When the authentication/encryption information 307 is blank, or when additional information is necessary, an inquiry is made with the user to acquire information. Furthermore, when the network connecting device 100 is already in a connected state with another network 101 that is different from the network 101 intended for connection at the present step, the network connection section 221 disconnects the other network 101 with which the connected state has been formed.

The automatic connection control section 213 refers to the connecting process information 309 of the profile acquired at step S503, and executes the process described therein.

Step S510: The automatic connection control section 213 refers to the profile list 300 managed by the profile management section 222, and confirms the presence or absence of a profile in which the automatic connection priority level 303 is set as the next priority of "K+1." As a result of the confirmation, when a profile in which the automatic connection priority level 303 is "K+1" is absent, the process ends. When a profile in which the automatic connection priority level 303 is "K+1" is present, the process advances to step S511.

Step S511: The automatic connection control section 213 adds 1 to K, and repeats the processes at step S503 and beyond.

When the determination result at step S505 is "unusable," the reason thereof may be notified to the user to provide convenience to the user.

Next, with reference to a flowchart shown in FIG. 6, an operation of the connection approval/disapproval determination process (step S405 in FIG. 4, step S507 in FIG. 5) will be described.

Step S601: The connection approval/disapproval determination section 231 refers to the connection approval/disapproval determination rule managed by the connection approval/disapproval determination rule management section 232. Specifically, the connection approval/disapproval determination rule is acquired, which corresponds to the profile name 301 that is a candidate for the connection approval/disapproval determination process and that has been received from the manual connection control section 212 at step S405 or from the automatic connection control section 213 at step S507. An example of the specific connection approval/disapproval determination rule will be described later.

Step S602: The connection approval/disapproval determination section 231 confirms the state in which the network connecting device 100 itself is situated, in accordance with the content of the connection approval/disapproval determination rule acquired at step S601. An example of the specific process at step S602 will be described later.

Step S603: The connection approval/disapproval determination section 231 determines the necessity of a security measure process, based on the confirmation result at step S602 and the content of the connection approval/disapproval determination rule acquired at step S601. When it is determined as "security measure process is necessary," the connection approval/disapproval determination section 231 instructs the security measure process execution section 233 to execute the security measure process. When it is determined as "security measure process is not necessary," the connection approval/disapproval determination section 231 advances the process to step S605. An example of the specific process at step S603 will be described later.

Step S604: The security measure process execution section 233 executes the security measure process. An example of the specific process at step S604 will be described later.

Step S605: The connection approval/disapproval determination section 231 confirms various states necessary for determining approval/disapproval of connection to the network 101 such as the state of the network connecting device 100, etc., in accordance with the content of the connection approval/disapproval determination rule acquired at step S601. The connection approval/disapproval determination section 231 determines approval/disapproval of connection to the network 101, based on the above described confirmation result and the content of the connection approval/disapproval determination rule acquired at step S601. An example of the specific process at step S605 will be described later.

Step S606: When the determination result is "connection disapproved," the connection approval/disapproval determination section 231 notifies the reason thereof to the manual connection control section 212 or the automatic connection control section 213. Notifying the reason is conducted in order to provide convenience to the user, and the present step may be omitted.

Described in the following is a specific example of the connection approval/disapproval determination rule in the connection approval/disapproval determination process and an example of the process.

FIG. 7 shows one example of the connection approval/disapproval determination rule. The connection approval/disapproval determination rule shown in FIG. 7 is a rule for determining approval/disapproval of connection in accordance with the state of the PAN 102. In FIG. 7, PAN-unformed connection approval/disapproval information 701 is information indicating whether a connection may be formed with the network 101 using each of the profiles in a state where the PAN 102 is not formed. PAN (bridge connection disapproval configuration)-formed connection approval/disapproval information 702 is information indicating whether a connection may be formed with the network 101 using each of the profiles in a state where the PAN 102 is formed under a configuration in which bridge connection is disapproved. PAN (bridge connection approval/disapproval configuration)-formed connection approval/disapproval information 703 is information indicating whether a connection may be formed with the network 101 using each of the profiles in a state where the PAN 102 is formed under a configuration in which bridge connection is approved. In the present embodiment, the possibility of an occurrence of a security problem becomes higher in the following order: when PAN is not form, when PAN (bridge connection disapproval configuration) is formed, and when PAN (bridge connection approval/disapproval configuration) is formed.

Shown in FIG. 7 are examples of: the PAN-unformed connection approval/disapproval information 701 corresponding to each of the profile names 301, the PAN (bridge connection disapproval configuration)-formed connection approval/disapproval information 702, and the PAN (bridge connection approval/disapproval configuration)-formed connection approval/disapproval information 703. In a state where the PAN 102 is not formed (i.e., the case with the PAN-unformed connection approval/disapproval information 701), network connection using profile A, profile B, profile C, or profile D is approved. In a state where the PAN 102 is formed under a configuration in which bridge connection is disapproved (i.e., the case with the PAN (bridge connection disapproval configuration)-formed connection approval/disapproval information 702), connection to the network 101 using profile A is disapproved, and connection to the network 101 using profile B, profile C, or profile D is approved. In a state where the PAN 102 is formed under a configuration in which bridge connection is approved (i.e., the case with the PAN (bridge connection approval/disapproval configuration)-formed connection approval/disapproval information 703), connection to the network 101 using profile A or profile B is disapproved, and connection to the network 101 using profile C or profile D is approved.

When the content of the connection approval/disapproval determination rule is that shown in FIG. 7, in the connection approval/disapproval determination process, the state of the PAN 102 is confirmed, approval/disapproval of connection is determined, and if necessary, changing of the state of the PAN 102 is conducted as the security measure process. Described in the following is a specific process example of steps S602 to S605 of the connection approval/disapproval determination process when the content of the connection approval/disapproval determination rule is that shown in FIG. 7.

Step S602: The connection approval/disapproval determination section 231 makes an inquiry with the PAN control section 223 regarding whether the PAN 102 is formed and the content of the configurations related to the bridge connection approval/disapproval, and confirms the state of the PAN 102.

Step S603: The connection approval/disapproval determination section 231 determines whether or not the security measure process is necessary, based on the state of the PAN 102 confirmed at step S602 and the content of the connection approval/disapproval determination rule. In the present process example, used as an example of the security measure process is a process of changing the state of the PAN 102. For example, in a case where the connection approval/disapproval determination process is conducted with profile B, if the state of the PAN 102 confirmed at step S602 is in an "unformed state" or a "formed state under a configuration in which bridge connection is disapproved," connection to the network 101 is approved in the current state, and thereby it is not necessary to change the state of the PAN 102. Therefore, the connection approval/disapproval determination section 231 determines that "security measure process is not necessary," and advances the process to step S605. On the other hand, if the state of the PAN 102 confirmed at step S602 is in a "formed state under a configuration in which bridge connection is approved," connection to the network 101 is disapproved. However, if this is changed to the "unformed state" or the "formed state under a configuration in which bridge connection is disapproved," the connection will be approved;" therefore, the connection approval/disapproval determination section 231 determines as "security measure process is necessary," and instructs the security measure process execution section 233 to change the state of the PAN 102 so as to satisfy the condition for obtaining a connection approval. Specifically, for example, an instruction is given for changing the bridge connection configuration of the PAN 102 to a disapproval configuration.

Step S604: The security measure process execution section 233 requests the PAN control section 223 to change the state of the PAN 102 in accordance with the content of the instruction by the connection approval/disapproval determination section 231. The PAN control section 223 changes the state of the PAN 102 in accordance with the request from the security measure process execution section 233.

Step S605: The connection approval/disapproval determination section 231 makes an inquiry with the PAN control section 223, and confirms the state of the PAN 102. The connection approval/disapproval determination section 231 determines approval/disapproval of connection based on the confirmed state of the PAN 102 and the content of the connection approval/disapproval determination rule. For example, in a case where the connection approval/disapproval determination process is conducted with profile B, if the confirmed state of the PAN 102 is in the "unformed state" or the "formed state under a configuration in which bridge connection is disapproved," a determination of "connection approved" is made; and if the state of the PAN 102 is in the "formed state under a configuration in which bridge connection is approved," a determination of "connection disapproved" is made.

By using the connection approval/disapproval determination rule shown in FIG. 7, for example, when the network connecting device 100 is to be connected to a network having a restriction on connectable terminals such as the case with company networks etc., it becomes possible to implement a control of approving connection only if the PAN 102 is in the unformed state or if the PAN 102 is in the formed state under a configuration in which bridge connection is disapproved.

Such a control can prevent a PAN client 103, which is originally not approved to connect to a company network, from being communicable to the company network by a bridge connection via the PAN 102 and the network connecting device 100.

One modification of the connection approval/disapproval determination rule shown in FIG. 7 is a rule in which approval/disapproval of connection to the network 101 is controlled in accordance with the connection status of the PAN client 103 to the PAN 102 or the type of the connected PAN client 103. In one example of the rule, when the PAN client 103 is connected to the PAN 102, connection to the network 101 is disapproved; and when the PAN client 103 is not connected to the PAN 102, connection to the network 101 is approved. In another example of the rule, when the PAN client 103 connected to the PAN 102 is, for example, a display, connection to the network 101 is approved; and when the PAN client 103 connected to the PAN 102 is, for example, a PC, connection to the network 101 is disapproved. When connection approval/disapproval determination rule is any of these rules, in the connection approval/disapproval determination process, the connection status of the PAN client 103 to the PAN 102 or the type of the connected PAN client 103 is confirmed, and the determination is made regarding approval/disapproval of connection.

Furthermore, as another modification of the connection approval/disapproval determination rule shown in FIG. 7, a rule is conceivable in which approval/disapproval of connection to the network 101 is controlled in accordance with the content of an authentication method and an encryption method of the PAN 102 and the content of an authentication method and an encryption method of the network 101. In one example of the rule, connection to the network 101 is disapproved when the PAN 102 is formed under a configuration in which bridge connection is approved and when security strength thereof is inferior to security strength of the network 101. When this rule is used as the connection approval/disapproval determination rule, in the connection approval/disapproval determination process, the authentication method and the encryption method of the PAN 102 and the authentication method and the encryption method of the network 101 are compared, the level of the security strength is confirmed, and then the determination is made regarding approval/disapproval of connection. The present modification makes it possible to prevent a problem such as, for example, when the PAN client 103 is communicating with the network 101 in a state where the PAN 102 is formed under a configuration in which bridge connection is approved and where security strength thereof is inferior than that of the network 101, a problem of communication on the PAN 102 having an inferior security strength than that of the network 101 being hacked and a content of the communication becoming exposed.

FIG. 8 shows another example of the connection approval/disapproval determination rule. In the connection approval/disapproval determination rule shown in FIG. 8, a necessity to re-input authentication information necessary for connecting to the network 101 is indicated. In FIG. 8, re-input necessity information (in the manual connection mode) 801 of authentication information is information indicating the necessity to re-input the authentication information when the connection mode of the network connecting device 100 is the manual connection mode. Re-input necessity information (in the automatic connection mode) 802 of the authentication information is information indicating the necessity to re-input the authentication information when the connection mode of the network connecting device 100 is the automatic connection mode. Thus, in FIG. 8, when the connection mode of the network connecting device 100 is the manual connection mode, re-input of the authentication information is indicated as unnecessary for a network connection using profile A, profile B, profile C, or profile D. Furthermore, when the connection mode of the network connecting device 100 is the automatic connection mode, re-input of the authentication information is indicated as necessary for a network connection using profile A or profile B, and re-input of the authentication information is indicated as unnecessary for a network connection using profile C or profile D.

When the connection approval/disapproval determination rule is that shown in FIG. 8, in the connection approval/disapproval determination process, the connection mode of the network connecting device 100 is confirmed, and, if necessary, a process of having the user re-input the authentication information necessary for connecting to the network 101 is conducted as a security measure process. Described in the following is a specific process example of steps S602 to S605 of the connection approval/disapproval determination process when the content of the connection approval/disapproval determination rule is that shown in FIG. 8.

Step S602: The connection approval/disapproval determination section 231 makes an inquiry with the connection mode control section 211, and confirms the current connection mode.

Step S603: The connection approval/disapproval determination section 231 determines the necessity of the security measure process, in accordance with the connection mode confirmed at step S602 and the content of the connection approval/disapproval determination rule. In the present process example, the security measure process is having the user re-input the authentication information necessary for connecting to the network 101. For example, in a case where the connection approval/disapproval determination process is conducted with profile A, if the connection mode confirmed at step S602 is "manual connection mode," it is not necessary to re-input the authentication information, and thereby the connection approval/disapproval determination section 231 determines as "security measure process is not necessary" and advances the process to step S605. On the other hand, if the connection mode confirmed at S602 is "automatic connection mode," it is necessary to re-input the authentication information, and thereby the connection approval/disapproval determination section 231 determines as "security measure process is necessary" and instructs the security measure process execution section 233 to conduct a process of having the user re-input the authentication information.

Step S604: The security measure process execution section 233 conducts the process of having the user re-input the authentication information, in accordance with the instruction from the connection approval/disapproval determination section 231. In the present embodiment, for example, a request is made to the manual connection control section 212 or the automatic connection control section 213 to blank out the authentication/encryption information 307 included in the profile information acquired and held by the manual connection control section 212 at step S402 or by the automatic connection control section 213 at step S503. As a response to the request by the security measure process execution section 233, the manual connection control section 212 or the automatic connection control section 213 blanks out the authentication/encryption information 307 included in the held profile information. Since the authentication/encryption information 307 is changed to blank, the network connection section 221 makes an inquiry with the user regarding information for authentication/encryption at step S407 or step S509 described above.

Step S605: The connection approval/disapproval determination section 231 determines as "connection approved."

As a result of using the connection approval/disapproval determination rule as shown in FIG. 8, it becomes possible to conduct a control of requiring a re-input of the authentication information when connecting to the network 101 using a predetermined profile with a predetermined connection mode. One example of the connection approval/disapproval determination rule is a configuration in which a re-input of the authentication information in the automatic connection mode is necessary when connecting to a network 101 that should raise awareness of the user, such as a company network, a fee-incurring network, or the like, however, the re-input is unnecessary otherwise. With this, an implementation becomes possible to have the user re-input the authentication information in the automatic connection mode when connecting to a network 101 that should raise awareness of the user upon connection.

One modification of the connection approval/disapproval determination rule shown in FIG. 8 is a mode in which, for example, a predetermined message such as a warning message or the like is displayed instead of having the authentication information re-input. In this case, the security measure process execution section 233 displays the predetermined message at step S604. A conceivable specific example of the predetermined message is, for example, a content that notifies about a connectable network 101 and makes an inquiry whether to form a connection therewith. When the user responds to this inquiry as to form a connection, a connection with the network is formed, and when the user did not respond to the inquiry or when the user responded as not to form a connection, a connection with the network is not formed.

FIG. 9 shows another example of the connection approval/disapproval determination rule. No-operation-continuation connection approval/disapproval information 901 shown in FIG. 9 indicates, as the connection approval/disapproval determination rule, approval/disapproval of connection to the network 101 when a user operation on the network connecting device 100 is absent for a predetermined time or more.

When the content of the connection approval/disapproval determination rule is that shown in FIG. 9, in the connection approval/disapproval determination process, a confirmation is made with regard to how long a state absent of a user operation on the network connecting device 100 has continued, and the determination of the connection approval/disapproval is conducted. Described in the following is a specific process example of steps S602 to S605 of the connection approval/disapproval determination process in a case where the content of the connection approval/disapproval determination rule is that shown in FIG. 9.

Step S602: The connection approval/disapproval determination section 231 confirms a continuation time of the state absent of a user operation on the network connecting device 100. In the present modification, the continuation time of the state absent of a user operation is measured by a no-operation time measuring section consisting of a timer or the like that is not shown, and the connection approval/disapproval determination section 231 conducts the confirmation by making an inquiry with the no-operation time measuring section such as the timer or the like.

Step S603: The connection approval/disapproval determination section 231 determines the necessity of the security measure process based on the non-operating continuation time confirmed at step S602. In the present process example, the security measure process is making an inquiry with the user regarding whether or not a connection to the network 101 can be formed. For example, in a case where the connection approval/disapproval determination process is conducted with profile A, if the non-operating continuation time confirmed at step S602 is less than a predetermined time, connection to the network 101 is approved in the current state, and thereby the connection approval/disapproval determination section 231 determines as "security measure process is not necessary" and advances the process to step S605. On the other hand, if the non-operating continuation time confirmed at step S602 is equal to or more than the predetermined time, an inquiry with the user is necessary, and thereby the connection approval/disapproval determination section 231 determines as "security measure process is necessary," and instructs the security measure process execution section 233 to make an inquiry with the user regarding approval/disapproval of connection.

Step S604: In accordance with the instruction by the connection approval/disapproval determination section 231, the security measure process execution section 233 makes an inquiry with the user regarding whether or not a connection to the network 101 can be formed, and receives a response from the user.

Step S605: The connection approval/disapproval determination section 231 confirms the non-operating continuation time, and determines approval/disapproval of connection. However, if a response of "connection disapproved" is received from the user at step S604, it is determined as "connection disapproved" even when the non-operating continuation time is less than the predetermined time.

As a result of using the connection approval/disapproval determination rule as shown in FIG. 9, it becomes possible to conduct a control such that a connection to the network 101 using the predetermined profile is not formed when the non-operating continuation time has continued for the predetermined time or more. When the non-operating continuation time has continued for the predetermined time or more, it is highly possible that the user has not used the network connecting device 100 and thereby connection to the network 101 is not necessary. The present modification can prevent such an unnecessary connection.

Another example of the connection approval/disapproval determination rule is a mode in which approval/disapproval of connection to the network 101 is indicated in accordance with a presence or absence of having a removable external storage medium mounted onto the network connecting device 100. For example, in a state where a removable storage medium is mounted, a configuration is set so as to disapprove connection to a network 101 in which confidential information may exist, such as a company network or the like. When the connection approval/disapproval determination rule is that of the present modification, in the connection approval/disapproval determination process, the presence or absence of having a removable external storage medium mounted onto the network connecting device 100 is confirmed, and the determination of approval/disapproval of connection to the network 101 is conducted. With the present modification, for example, it becomes possible to prohibit connecting to the company network in a state where an external storage medium is connected, and thereby it becomes possible to prevent confidential information from being downloaded from the network to be stored on the external storage medium.

Another example of the connection approval/disapproval determination rule is one in which, when the network connecting device 100 is connected to the network 101, an operation which is to be conducted upon newly connecting to another network 101 is configured in accordance with the type of the previously-connected network 101. For example, a configuration can be set to notify, as the security measure process, the user regarding a connection to an untrustworthy network, when connection is to be formed in the automatic connection mode with an untrustworthy network such as a public network or the like in a state where connection has been already formed with a trustworthy network such as a company network, a home network, or the like. In this case, in the connection approval/disapproval determination process, the connection status of the network connecting device 100 to the network 101 is confirmed, and, as the security measure process, a notification is given to the user as necessary. With this, it becomes possible to prevent problems such as automatic switching of a connection from a trustworthy network such as a company network, a home network, or the like to an untrustworthy network such as a public network or the like without the knowledge of the user.

Another example of the connection approval/disapproval determination rule is a mode in which connection to the network 101 is controlled in accordance with the content of each information of the profile used for connecting to the network 101, such as the network type 304, the authentication/encryption information 307, the connecting process information 309, or the like. In one example, connection to the network 101 in the automatic connection mode is disapproved when the content of the connecting process information 309 is to start-up an application for conducting a predetermined security related process.

Another example of the connection approval/disapproval determination rule is one that indicates approval/disapproval of connection to the network 101 in accordance with a physical state of the network connecting device 100. For example, a configuration can be set to disapprove connection to the network 101 in a state where a lid of the network connecting device 100 is closed if the network connecting device 100 has a lid, or to disapprove connection to the network 101 when a housing or screen of the network connecting device 100 is oriented in a predetermined direction.

In the description above, in the connection approval/disapproval determination process, the necessity of the security measure process is determined at step S603, and, if necessary, the process is conducted at step S604, and the connection approval/disapproval determination is conducted at step S605. However, it is also possible to conduct either the security measure process at step S603 and step S604 or the connection approval/disapproval determination at S605. Furthermore, the order in which the security measure process and the connection approval/disapproval determination are conducted may be reversed. Furthermore, depending on the content of the connection approval/disapproval determination rule, as the security measure process, a process having the same content or a different content may be repeated for multiple times in accordance with needs.

In the description above, although the confirmation of various states are repeated at step S602 and step S605, the confirmation may be conducted at either one of these steps.

Although it has been described that the automatic connection priority level 303 in FIG. 3 is configured for every profile, the present invention is not limited thereto, and the automatic connection priority level 303 may be configured for each of the network types 304. For example, one possible configuration is to assign a priority level of "1" for a profile whose network type 304 is "WLAN," and a priority level of "2" for a profile whose network type 304 is "WWAN."

Although it has been described that the user configures each information of the profile, the present invention is not limited thereto, and, for example, the network connecting device 100 may automatically configure each information of the profile. For example, information regarding the authentication method, the encryption method, and the like included in the authentication/encryption information 307 can be acquired from the network 101 and configured automatically. Furthermore, information for the configurations may be distributed from a profile managing server or the like, which is not shown, via the network 101 or the like, and, by using that, various information of the profile may be configured.

Figure 4:
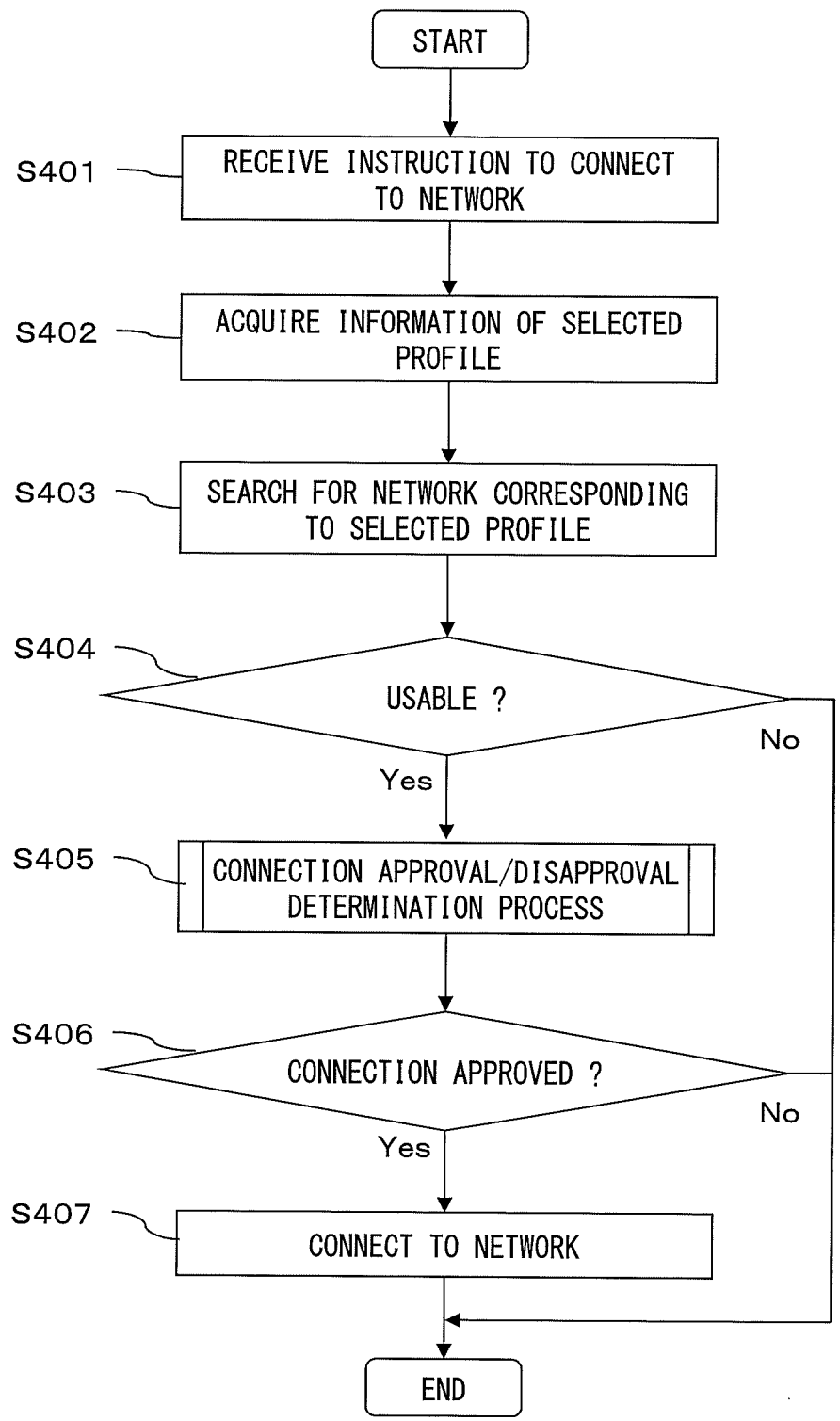
FIG. 4 is a flowchart showing a manual connection process in the first embodiment of the present invention.
Figure 5:
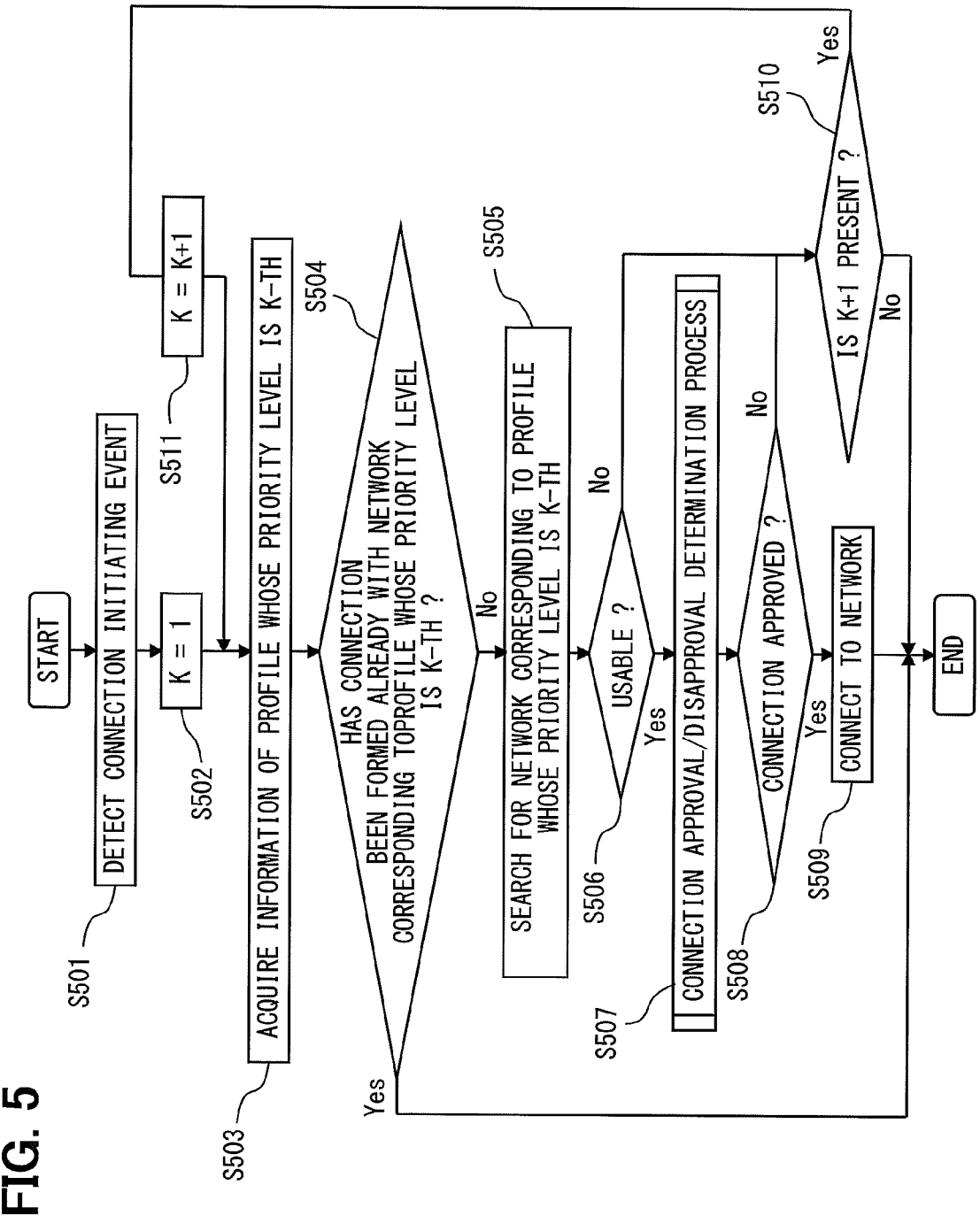
FIG. 5 is a flowchart showing an automatic connection process in the first embodiment of the present invention.

At step S407 in FIG. 4 and step S509 in FIG. 5, before connecting to the network 101, the network connection section 221 may confirm with the user regarding approval/disapproval of connection, and form a connection only when the user approves the connection.

With regard to step S407 in FIG. 4 and step S509 in FIG. 5, it has been described that, when a connected state has been already formed with another network 101 that is different from the network 101 intended for connection at the present step, the network connection section 221 disconnects the connection; however, the present invention is not limited thereto, and the connection may be maintained instead of being disconnected. Furthermore, controls may be conducted so as to not disconnect but maintain the connection at step S407 in FIG. 4 in the manual connection mode, and disconnect the connection at step S509 in FIG. 5 in the automatic connection mode. Furthermore, when disconnecting the connection, before executing the disconnection, a confirmation may be made with the user regarding approval/disapproval of the execution, and disconnection may be conducted only when the user approves the execution thereof.

Although it has been described that the content of the connection approval/disapproval determination rule is configured by the user, the present invention is not limited thereto, and, for example, the network connecting device 100 may automatically apply a predetermined recommended configuration. Furthermore, information for the configurations may be distributed from a connection approval/disapproval determination rule management server or the like, which is not shown, via the network 101 or the like, and, by using that, the connection approval/disapproval determination rule may be set.

Although it has been described that conditions of the connection approval/disapproval determination rule is configured for every profile, the present invention is not limited thereto, and a single condition may be configured for the network connecting device 100, or a single condition may be configured for each network type 304.

The security measure process execution section 233 for the connection approval/disapproval determination process at step S605 may confirm with the user regarding approval/disapproval of the execution before executing the security measure process, and may conduct the process only when the user approves the execution thereof.

When the network 101 is a wired LAN, the network connection may be formed at a point in time when a cable is connected to a network device 201 for wired LAN connection. In such a case, the connection approval/disapproval determination process may be skipped, and only the security measure process may be conducted if necessary.

When a predetermined environmental change has occurred after the network connecting device 100 has connected to the network 101, the manual connection control section 212 and the automatic connection control section 213 may detect the environmental change and conduct the security measure process or a process of disconnecting the connection to the network 101 as necessary. The predetermined environmental change includes the changes of the various states that are confirmed in the above described connection approval/disapproval determination process, such a change in the formed state of the PAN 102, connecting of an external storage medium, the non-operating continuation time becoming equal to or more than the predetermined time, and the like.

When an occurrence of a predetermined environmental change is detected, the manual connection control section 212 and the automatic connection control section 213 confirm the connection approval/disapproval determination rule, and confirm approval/disapproval of connection to the currently-connected network 101 after the environmental change. As a result of the confirmation, when connection to the network 101 in a state after the change is disapproved, a process is conducted as the security measure process for changing the environment to a state in which connection to the network 101 is approved, or a process of disconnecting the connection to the network 101 is conducted.

In the following, as an example, description is provided for a process conducted when the formed state of the PAN 102 has changed. When a change in the formed state of the PAN 102 is detected, the manual connection control section 212 and the automatic connection control section 213 confirm the connection approval/disapproval determination rule, and confirm whether connection to the currently-connected network 101 is approved with a state of the PAN 102 after the change. As a result of the confirmation, when connection to the network 101 with the state of the PAN 102 after the change is disapproved, a process is conducted as the security measure process for changing the formed state of the PAN 102 to a state that enables connection to the network 101, or a process of disconnecting the connection to the network 101 is conducted.

With the present embodiment, the possibility of an occurrence of a security problem when connecting to a network is taken into consideration, and suppression of connection and execution of measures are conducted in accordance with needs; therefore, it becomes possible to reduce the possibility of an occurrence of a security problem due to connection to a network.

Second Embodiment

A second embodiment of the present invention will be described.

Similar to the network connecting device according to the first embodiment, a network connecting device 200 according to the present embodiment is connectable to each of the first to N-th networks, and the networks include, for example, WWAN, WLAN, WiMAX networks, wired LANs, and the like.

Similar to the network connecting device according to the first embodiment, the network connecting device 200 may include, for example, a personal computer, a mobile phone, and a Personal Digital Assistant having multiple functions, and may be an access point that allows a PAN client connected thereto via the PAN to connect to each of the first network to the N-th network.

Figure 10:
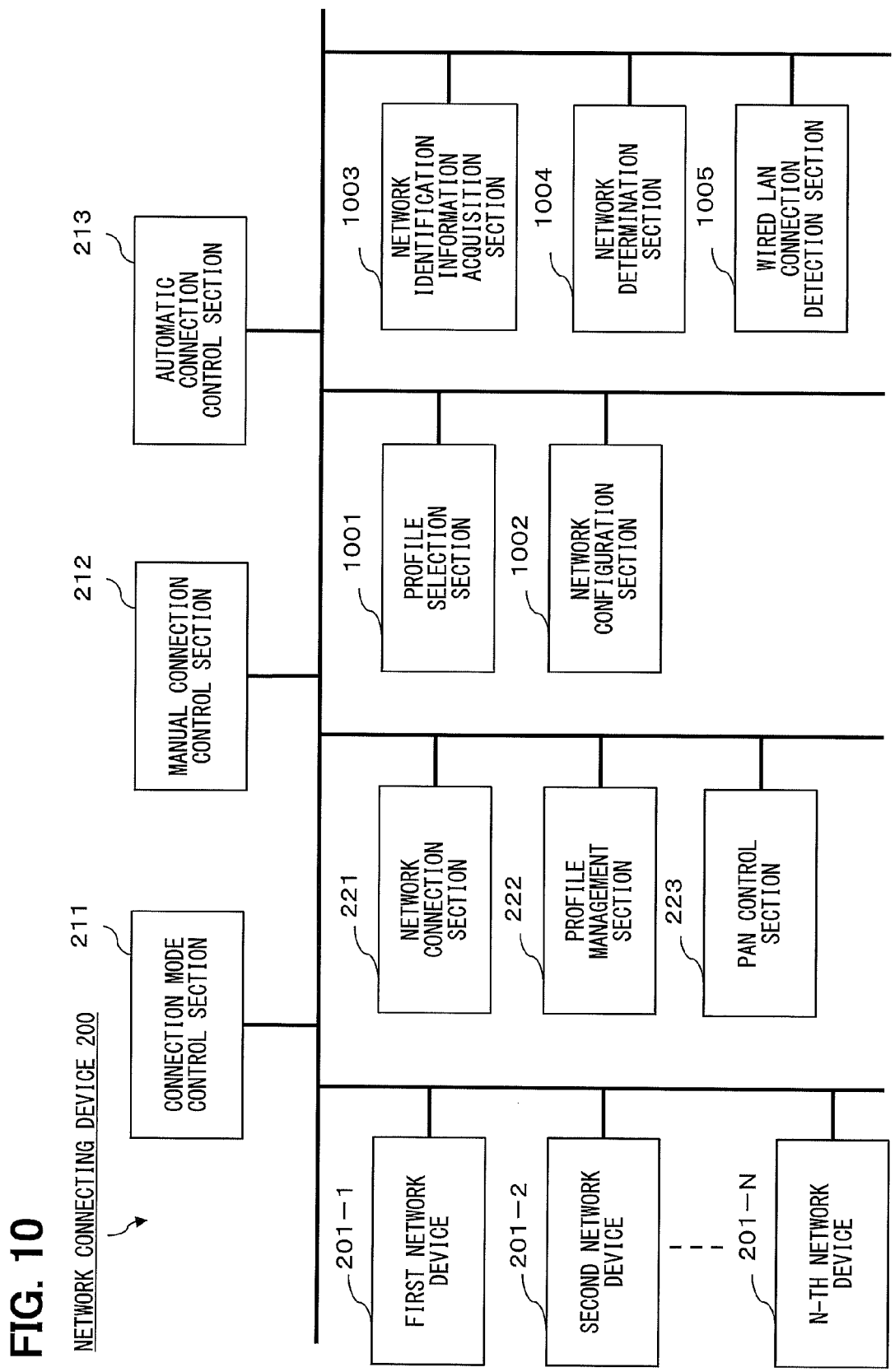
FIG. 10 is a block diagram showing a configuration of a network connecting device according to a second embodiment of the present invention.

FIG. 10 is a functional block diagram showing the network connecting device 200 according to one embodiment of the present invention. Components identical to those in the network connecting device 100 are given identical reference characters. In FIG. 10, the network connecting device 200 includes one or more of the network devices 201-1 to 201-N, the connection mode control section 211, the manual connection control section 212, the automatic connection control section 213, the network connection section 221, the profile management section 222, the PAN control section 223, a profile selection section 1001, a network configuration section 1002, a network identification information acquisition section 1003, a network determination section 1004, and a wired LAN connection detection section 1005.

The network devices 201-1 to 201-N, the connection mode control section 211, the manual connection control section 212, the automatic connection control section 213, the network connection section 221, the profile management section 222, and the PAN control section 223 are identical to those of the first embodiment and descriptions thereof are omitted.

FIG. 11 shows examples of profiles configured with information necessary for forming a network connection between the network connecting device 200 and the first network to the N-th network. Information similar to those in the first embodiment are configured to each of the profiles in a profile list 1100 shown in FIG. 11. However, in FIG. 11, as the network identification information 306, examples of specific identifiers are also shown, such as MAC address, SSID, operator information, and the like. In addition, as the TCP/IP configuration information 308, examples such as a subnet mask and a default gateway are also shown.

As shown in FIG. 11, in the network connecting device 200, with profile A, a connection to a wired LAN is formed by the first network device 201-1, and a network connection is achieved with the first network. Furthermore, it is defined in profile A that, when achieving a network connection with the first network, changes are made in a network configuration (TCP/IP configuration) of the network connecting device 200 so as to each change the IP address to 192.168.1.1, the subnet mask to 255.255.0.0, the default gateway to 192.168.0.1, and that, when the network connection with the first network has been achieved, application W1 is started up and screen U1 is displayed.

In the network connecting device 200, with profile B, a connection to WLAN is formed by the second network device 201-2, and a network connection is achieved with the second network. When achieving the network connection, authentication method X2, encryption method Y2, and authentication information Z2, are used. Furthermore, it is defined in profile B that, when achieving a network connection with the second network, changes are made in the network configuration (TCP/IP configuration) of the network connecting device 200 so as to each change the IP address to 192.168.2.2, the subnet mask to 255.255.0.0, and the default gateway to 192.168.0.2, and that, when the network connection with the second network has been achieved, application W2 is started up and screen U2 is displayed.

In the network connecting device 200, with profile C, a connection to a wired LAN is formed by the third network device 201-3, and a network connection is achieved with the third network. Furthermore, it is defined in profile C that, when achieving a network connection with the third network, changes are made in the network configuration (TCP/IP configuration) of the network connecting device 200 so as to each change the IP address to 192.168.3.3, the subnet mask to 255.255.0.0, and the default gateway to 192.168.0.3; and that, when the network connection with the third network has been achieved, application W3 is started up and screen U3 is displayed.

In the network connecting device 200, with profile D, a connection to a wired LAN is formed by the fourth network device 201-4, and a network connection is achieved with the fourth network. Furthermore, it is defined in profile D that, when achieving a network connection with the fourth network, in the network configuration (TCP/IP configuration) of the network connecting device 200, the IP address, the subnet mask, and the default gateway are changed to a configuration acquired from a DHCP, and that, when network connection with the fourth network has been achieved, application W4 is started up and screen U4 is displayed.

In the network connecting device 200, with profile E, a connection to WiMAX is formed by the fifth network device 201-5, and a network connection is achieved with the fifth network. When achieving the network connection, authentication method X5, encryption method Y5, and authentication information Z5 are used. Furthermore, since the automatic connection approval/disapproval flag 302 is defined as "usage disapproved" in profile E, a network connection with the fifth network is achieved, for example, in accordance with an instruction from the user (in the manual connection mode), or after a request has been made with the user regarding a confirmation of whether or not to form the network connection. In addition, it is defined in profile E that, when achieving a network connection with the fifth network, changes are made in the network configuration (TCP/IP configuration) of the network connecting device 200 so as to change the IP address to 192.168.5.5, the subnet mask to 255.255.0.0, and the default gateway to 192.168.0.5; and that, when the network connection with the fifth network has been achieved, application W5 is started up and screen U5 is displayed.

Configurations for other profiles are set in a similar manner.

The value configured for the automatic connection approval/disapproval flag 302 may be set, for example, by taking into consideration of security strength of the network connection based on the above described authentication/encryption information. Specifically, a configuration of "usage approved" may be set for an encrypted network, and a configuration of "usage disapproved" may be set for an unencrypted network. Furthermore, even with encrypted networks, it is possible to, for example, configure as "usage approved" only for encrypted networks having security strength at a predetermined level or higher, such as TKIP, AES, and the like, and configure as "usage disapproved" for encrypted networks having security strength less than the predetermined level, such WEP and the like. In such manner, safety can be ensured with regard to network connection by, for example, setting a configuration as "automatic connection approved" only for a network connection having security strength at a predetermined level. However, in the case with a wired LAN, a LAN cable is connected to a LAN connector of the network connecting device 200 by the user through a manual operation, and thereby a security problem that becomes a concern in a wireless network is unlikely to occur. Therefore, in the case with a wired LAN, a configuration of allowing automatic connection for all may be used.

Here, the automatic connection priority level 303 may be configured based on, for example, the network type 304 such that trustworthiness of a network connection is taken into consideration. Specifically, the automatic connection priority level 303 may be configured in sequence as, for example, wired LAN, WLAN, WiMAX, and WWAN.

In such manner, profiles configured with information necessary for forming a network connection between the network connecting device 200 and the first network to the N-th network are stored in the profile management section 222.

In more detail, the network configuration section 1002 and the network connection section 221 control the first network device 201-1 to the N-th network device 201-N based on the profile managed by the profile management section 222, and connects the network connecting device 200 to the first network to the N-th network. Particularly when connecting to a wired LAN, the network configuration section 1002 changes the network configuration such as the IP address and the like of the network connecting device 200 based on the TCP/IP configuration information 308 defined in the profile, the network connection section 221 determines whether a wired LAN with which connection is formed by a LAN cable matches a network to be connected using the profile, and, if they match, the profile is applied and a process conducted upon connecting to a network is conducted. Details of a method for determining whether a wired LAN with which connection is formed by a LAN cable matches a network to be connected using the profile will be described later.

When connection of a LAN cable to a LAN connector is detected in the network connecting device 200, the profile selection section 1001 selects, in sequence from among the profiles managed by the profile management section 222, a profile whose network type 304 is wired LAN and that indicates wired LAN connection. When there are multiple profiles indicating wired LAN connection, for example, from among the multiple profiles indicating wired LAN connection, a profile may be selected in sequence from one that has a high priority based on the automatic connection priority level 303 shown in FIG. 11.

For example, network connections to the network connecting device 200 may be stored as a connection history in storage means such as a memory, and the order for selecting a profile indicating wired LAN connection may be configured in accordance with the number of connections and/or the number of disconnection with the wired LAN connection corresponding to the profile.

Based on a profile that is selected in sequence by the profile selection section 1001, the network configuration section 1002 changes the network configuration for wired LAN connection of the network connecting device 200 to a network configuration corresponding to the profile. Specifically, for example, the TCP/IP configuration for wired LAN connection of the network connecting device 200 is set based on the TCP/IP configuration information 308 included in the profile selected by the profile selection section 1001.

Based on the network configuration set by the network configuration section 1002, the network identification information acquisition section 1003 makes a request with the network to which the network connecting device 200 is connected by the LAN cable, regarding network identification information for identifying the network, and acquires the network identification information. In more detail, since the network is a wired LAN, the network identification information acquisition section 1003 may acquire a MAC address of a control device (e.g., a router and/or default gateway etc.,) in the network. Specifically, for example, the network identification information acquisition section 1003 requests a router and/or a default gateway in the network for a MAC address using ARP (Address Resolution Protocol), and acquires a response therefrom.

Then, the MAC address acquired by the network identification information acquisition section 1003 may be regarded as the network identification information of the wired LAN.

The method used by the network identification information acquisition section 1003 for acquiring the network identification information is not limited to the method of using ARP, and, for example, a method that may be used is receiving, with usage of RIP (Routing Information Protocol), a message from a control device in the network to which the network connecting device 200 is connected by the LAN cable.

The network determination section 1004 compares the network identification information acquired by the network identification information acquisition section 1003 and the network identification information 306 included in the profile selected by the profile selection section 1001. Then, the network determination section 1004 determines whether the profile selected by the profile selection section 1001 is a profile corresponding to the wired LAN with which connection is formed by the LAN cable.

Specifically, as shown in FIG. 11, identification information of the control device for achieving the network connection is included as the network identification information 306 in the profile indicating wired LAN connection. Here, the identification information of the control device is the MAC address of the router and/or the default gateway.

Then, the network determination section 1004 compares the MAC address acquired by the network identification information acquisition section 1003, and the MAC address included in the profile selected by the profile selection section 1001. When the MAC addresses match each other, the network determination section 1004 determines that the profile selected by the profile selection section 1001 is the profile corresponding to the wired LAN with which connection is formed by the LAN cable.

The wired LAN connection detection section 1005 detects connecting of the LAN cable to the LAN connector of the network connecting device 200.

Figure 12:
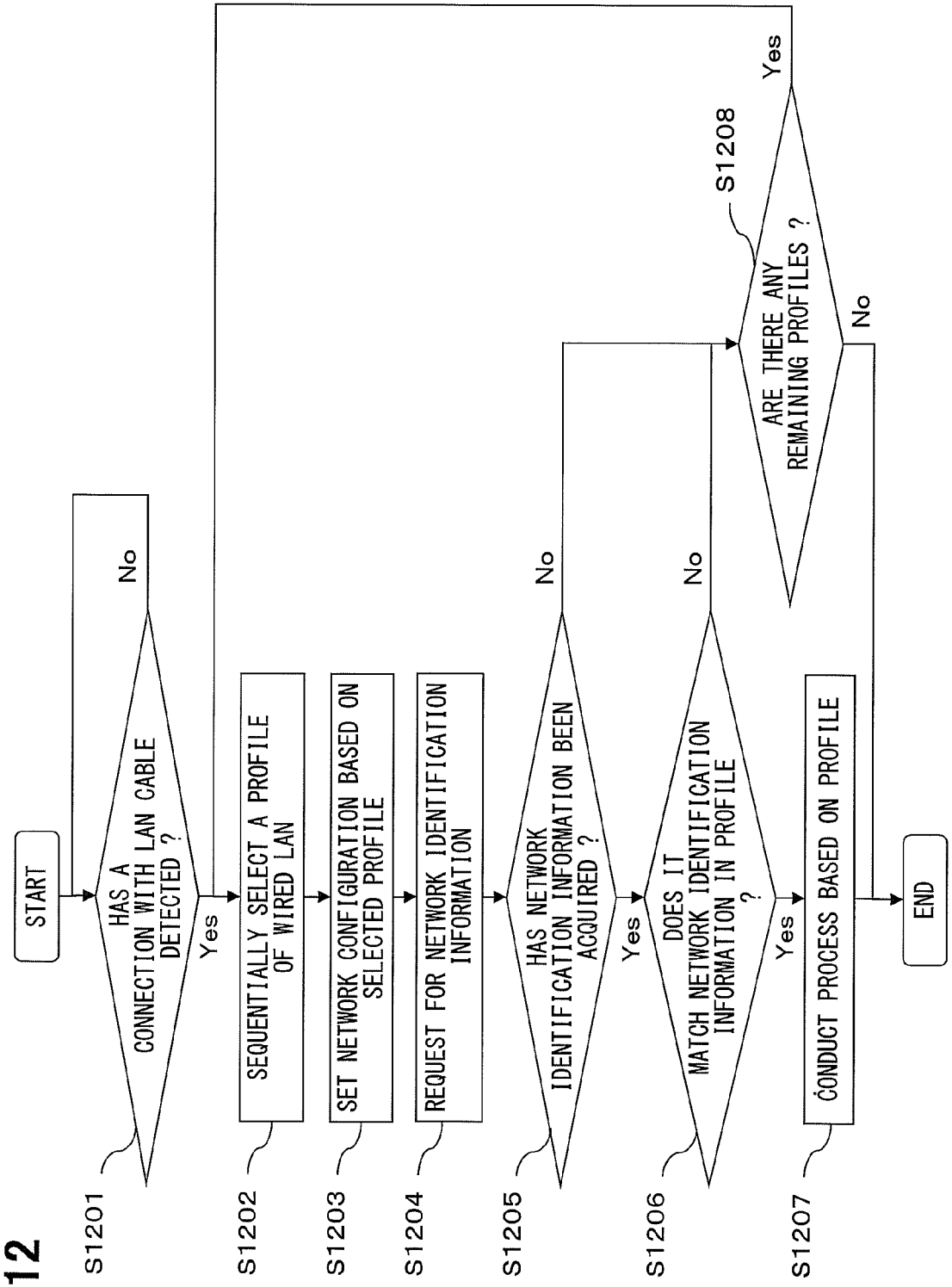
FIG. 12 is a flowchart showing a network connection process in the second embodiment of the present invention.

Next, a flow of processes of a network connecting method executed by the network connecting device 200 will be described in detail. FIG. 12 is a flowchart showing the flow of the processes of the network connecting method executed by the network connecting device 200.

Step S1201: The wired LAN connection detection section 1005 monitors whether or not a LAN cable has been connected to the LAN connector of the network connecting device 200. When a connection of a LAN cable to the LAN connector has been detected, the wired LAN connection detection section 1005 advances the process to step S1202 (Yes at step S1201).

On the other hand, when a connection of a LAN cable to the LAN connector has not been detected, the wired LAN connection detection section 1005 returns to the process at step S1201 and continues the monitoring (No at step S1201).

Step S1202: From among the profiles managed by the profile management section 222, the profile selection section 1001 selects, in sequence, a profile whose network type 304 is wired LAN and that indicates wired LAN connection. For example, as shown in FIG. 11, when there are multiple profiles of A to E, profile A, profile C, and profile D, whose network types 304 are wired LAN, are selected in sequence. Furthermore, with regard to the sequence in which the selecting is made, profile A is selected first, in accordance with the automatic connection priority level 303.

Step S1203: Based on a profile that is selected at step S1202, the network configuration section 1002 changes the network configuration (TCP/IP configuration etc.,) for wired LAN connection of the network connecting device 200 to a network configuration corresponding to the profile. Here, a network configuration for a wired LAN corresponding to profile A is applied.

Step S1204: The network identification information acquisition section 1003 makes a request with the network to which the network connecting device 200 is connected by the LAN cable that has been connected at step S1201, regarding network identification information for identifying the network. Specifically, the network identification information acquisition section 1003 makes a request using ARP for a MAC address of a control device (e.g., a router and/or default gateway etc.,) in the network. Then, the network identification information acquisition section 1003 acquires a MAC address from the control device in the network. In the present embodiment, a default gateway's IP address stored in the TCP/IP configuration information 308 is used as the IP address of the control device in the network necessary for using ARP.

Step S1205: The network determination section 1004 determines whether or not the network identification information has been acquired at step S1204. Specifically, the network determination section 1004 may make a request for the MAC address of the control device in the network, and may determine whether or not a response message to the request has been received within a predetermined period. For example, when there is no response for a predetermined time and when a timeout error has occurred, the network determination section 1004 may determine that a response message to the request has not been received, and may advance the process to step S1208 (No at step S1205).

On the other hand, when a response message to the request has been received, the network determination section 1004 advances the process to step S1206 (Yes at step S1205).

Step S1206: The network determination section 1004 compares the network identification information acquired at step S1205 and the network identification information 306 included in the profile selected at step S1202. Specifically, a comparison is made between the MAC address of the control device in the network, which has been acquired using ARP, and the MAC address of the network identification information 306 included in the selected profile. Here, when profile A is selected at step S1202, the network determination section 1004 determines whether or not the MAC address of the control device in the network, which has been acquired using ARP, matches "a1111111111."

When the MAC address of the control device in the network, which has been acquired using ARP, matches "a1111111111," the network determination section 1004 determines that profile A selected at step S1202 is the profile corresponding to the wired LAN with which connection is currently formed by the LAN cable, and advances the process to step S1207 (Yes at step S1206).

On the other hand, when the MAC address of the control device in the network, which has been acquired using ARP, does not match "a1111111111," the network determination section 1004 determines that profile A selected at step S1202 is not the profile corresponding to the wired LAN with which connection is currently formed by the LAN cable, and advances the process to step S1208 (No at step S1206).

Step S1207: The network connection section 221 controls a network device based on the network configuration set at step S1203 for the wired LAN with which connection is currently formed by the LAN cable. Here, when profile A is selected at step S1202 and a network configuration is applied based on profile A at step S1203, the network connection section 221 applies profile A if the MAC address of the control device in the network, which has been acquired using ARP, is "a1111111111." Specifically, the first network device 201-1 is controlled such that a connection is formed between the network connecting device 200 and the first network. Then, the process conducted upon connecting to a network, in this case, the first network, is conducted. Specifically, application W1 is started up, and screen U1 is displayed.

A state that begins with the connection of the LAN cable to the network connecting device 200, followed by the selection of the profile corresponding to the wired LAN intended for connection, and ends with the completion of the network connection process may be presented to the user using a GUI. Specifically, in steps S1202 to S1206 and step S1208, information may be presented to the user indicating that a confirmation of a profile is in progress; and when the profile corresponding to the wired LAN with which a connection is to be formed is applied and the process conducted upon connecting to a network is conducted at step S1207, information may be presented to the user indicating that a connected state is obtained using the profile.

On the other hand, when the MAC address of the control device in the network is requested and when a response message to the request has not been received (No at step S1205), or when there is no match between the MAC address of the control device in the network, which has been acquired using ARP, and the MAC address which is the network identification information 306 included in the select profile (No at step S1206), the process is advanced to step S1208.

Step S1208: With regard to the profiles that are managed by the profile management section 222 and that indicate wired LAN connection, it is determined whether there are any remaining profiles that have not been selected at step S1202.

Here, profile A is selected at step S1202 while profile C and profile D have not been selected, thus remain, and the process returns to step S1202 (Yes at step S1208).

At S1202, the profile selection section 1001 selects profile C in accordance with the automatic connection priority level 303. Then, processes at step S1203 to step S1206 are similarly executed.

Here, when the MAC address of the control device in the network, which has been acquired using ARP, matches "c33333333333," the network determination section 1004 determines that profile C selected at step S1202 is the profile corresponding to the wired LAN with which connection is currently formed by the LAN cable, and advances the process to step S1207 (Yes at step S1206).

Then, the third network device 201-3 is controlled such that a connection is formed between the network connecting device 200 and the third network. Furthermore, when a network connection is achieved with the third network, application W3 is started up and screen U3 is displayed. In other words, a network configuration based on profile C is implemented at step S1203, and by having profile C applied, the process conducted upon connecting to a network is conducted at step S1207.

On the other hand, when "No" is obtained at step S1205, or when "No" is obtained at step S1206, the process advances to step S1208 and step S1202 and the profile selection section 1001 selects profile D. Then, processes at step S1203 to step S1206 are executed similarly.

Here, when the MAC address of the control device in the network, which has been acquired using ARP, matches "d44444444444," the network determination section 1004 determines that profile D selected at step S1202 is the profile corresponding to the wired LAN with which connection is currently formed by the LAN cable, and advances the process to step S1207 (Yes at step S1206).

Then, the fourth network device 201-4 is controlled such that a connection is formed between the network connecting device 200 and the fourth network. Furthermore, when a network connection is achieved with the fourth network, application W4 is started up and screen U4 is displayed. In other words, a network configuration based on profile D is implemented at step S1203, and by having profile D applied, the process conducted upon connecting to a network is conducted at step S1207.

On the other hand, when "No" is obtained at step S1205, or when "No" is obtained at step S1206, with regard to the profiles that are managed by the profile management section 222 and that indicate wired LAN connection, it is determined at step S1208 whether there are any remaining profiles that are not selected at step S1202.

Here, profile A, profile C, and profile D are selected, and thereby, with regard to the profile that are managed by the profile management section 222 and that indicate wired LAN connection, it is determined that there is no remaining profile that has not been selected at step S1202, and the process ends (No at step S1208).

When "No" is obtained at step S1208 and when the process has ended, it can be recognized that the profile corresponding to the wired LAN with which connection is currently formed by the LAN cable is not managed by the profile management section 222. In such a case, the network connecting device 200 may notify the user to generate a profile corresponding to the wired LAN with which connection is currently formed by the LAN cable, or may automatically generate the profile.

As described above, according to the present embodiment, when a LAN cable is connected to the LAN connector, a profile that is managed by the profile management section 222 and that indicates wired LAN connection is automatically selected in sequence, and it is determined whether or not a selected profile is a profile corresponding to the wired LAN intended for connection. Therefore, a profile corresponding to the wired LAN intended for connection can be easily selected.

In the network connecting method according to the present embodiment, at step S1204, the MAC address of the control device is acquired using ARP; however, the MAC address of the control device may be acquired using RIP. Specifically, at step S1201, after detecting that a LAN cable has been connected to the LAN connector, the wired LAN connection detection section 1005 waits for a message transmitted from the control device for a predetermined time period. When a message including the MAC address of the control device is received within the predetermined time period, a comparison is made between the MAC address and the network identification information 306 (MAC address) included in profile A, profile C, and profile D. Then, by applying a profile whose network identification information 306 (MAC address) matches the MAC address, a profile corresponding to the wired LAN intended for connection can be easily selected.

On the other hand, when a message including the MAC address of the control device cannot be received within the predetermined time, the process at step S1202 and beyond may be executed.

Furthermore, at step S1208, when it is determined that there are no profiles remaining, instead of ending the processes, the predetermined period at step S1205 may be changed to a longer period, and the processes at steps S1202 to S1208 may be executed once again for each of the profiles. With this, even if there is a failure in identifying a profile in the first set of processes due to a network response of a wired LAN taking longer than the predetermined period, the possibility of succeeding in the identification becomes higher when a profile is selected for the second time. Furthermore, when processes are repeated in such a manner, the predetermined period in the first round may be set to be shorter than that used when a repeat is not conducted. With this, the time required until a to-be-identified profile is selected becomes short in the first round of processes. When a network response of a wired LAN is shorter than the predetermined period, the time required for identifying a profile can be shortened. On the other hand, when a network response of a wired LAN is longer than the predetermined period, even if identification has failed in the first round, a success can be expected in the second round.

In the examples of the profiles shown in FIG. 11, all the profiles are configured with the network identification information 306; however, with a wired LAN, there may be a case where the network identification information 306 is not configured. An example of such case is when the network connecting device 200 does not connect to an external network and when the network is formed in a private area.

In this case, at step S1204 and step S1205, the process of acquiring the network identification information cannot be conducted, or, even if the process of acquiring the network identification information can be executed, the process at step S1206 cannot be executed since the network identification information 306 is not configured in the profile. Therefore, when the network identification information 306 is not configured in the selected profile, in the network configuration set at step S1203, the selected profile may be determined as a profile corresponding to the wired LAN with which connection is formed by the LAN cable, if it can be determined that communication can be conducted via the wired LAN with which connection is formed by the LAN cable. For example, when the TCP/IP configuration described in the profile is DHCP (Dynamic Host Configuration Protocol), if the IP address is acquired with DHCP and if it can be determined that communication can be conducted, the selected profile may be determined as a profile corresponding to the wired LAN with which connection is formed by the LAN cable.

Here, it has been described that, at step S1203, a network configuration (TCP/IP configuration etc.,) for wired LAN connection of the network connecting device 200 is configured based on the profile selected at step S1202; however, the subsequent processes may be conducted without making any changes to the current network configuration of the network connecting device 200. Specifically, instead of conducting the network configuration at step S1203, processes at the next step S1204 and step S1205 are conducted without making any changes to the current network configuration. At step S1204, the MAC address of a default gateway under the current network configuration is requested as the network identification information, and when "Yes" is obtained at step S1205, at step S1206, from among the profiles managed by the profile management section 222, the profile selection section 1001 selects in sequence a profile whose network type 304 is wired LAN and that indicates wired LAN connection. Then, the network identification information acquired at step S1205 and the network identification information 306 included in the profile selected in sequence may be compared. On the other hand, when "No" is obtained at step S1205, or when "No" is obtained at step S1206 for all the profiles that indicate wired LAN connection, processes starting from the above described step S1203 are conducted. As a result, when the network configuration process at step S1203 is a process that requires much time, it becomes possible to omit the network configuration process at step S1203 depending on the status of the current network configuration, and thereby an advantageous effect of being able to accelerate the processes can be obtained. Furthermore, the above described processes may be conducted similarly after changing, at step S1203, the network configuration (TCP/IP configuration etc.,) for wired LAN connection of the network connecting device 200 to a configuration for DHCP. Specifically, the network configuration is changed to a configuration of DHCP at step S1203, and processes at the next step S1204 and step S1205 are conducted. At step S1204, the MAC address of a default gateway configured by DHCP is requested as the network identification information, and when "Yes" is obtained at step S1205, from among the profiles managed by the profile management section 222, the profile selection section 1001 selects in sequence a profile whose network type 304 is wired LAN and that indicates wired LAN connection at step S1206. Then, the network identification information acquired a step S1205 and the network identification information 306 included in the profile selected in sequence may be compared. On the other hand, when "No" is obtained at step S1205, or when "No" is obtained at step S1206 for all the profiles that indicate wired LAN connection, processes starting from the above described step S1203 are conducted for each of the profiles in which the TCP/IP configuration information 308 is not "DHCP" and that indicate wired LAN connection. As a result, it becomes possible to first conduct confirmation processes all at once for wired LAN profiles that are connectable with a DHCP configuration, and thereby an advantageous effect of being able to accelerate the processes can be obtained.

Furthermore, at a predetermined timing, such as when the LAN cable is unplugged, or when a LAN cable has not been connected for a predetermined time or more, the network configuration section 1002 may change the network configuration in advance to a predetermined content. Conceivable contents that can be used as the predetermined content for the configuration include, for example, changing to a configuration corresponding to a profile having a high priority level, changing to a configuration corresponding to a network that has been connected for a large number of times according to a connection history, changing to a DHCP configuration, and changing to configuration specified by the user in advance.

With the present embodiment, when connecting to a wired LAN, a profile corresponding to the wired LAN intended for connection can be easily selected from among a plurality of managed profiles.

Third Embodiment

A third embodiment of the present invention will be described.

Similar to the network connecting device according to the first embodiment, a network connecting device 300 according to the present embodiment is connectable to each of the first to N-th networks, and the network includes, for example, WWAN, WLAN, WiMAX networks, wired LANs, and the like.

Similar to the network connecting device according to the first embodiment, the network connecting device 300 may include, for example, a personal computer, a mobile phone, and a Personal Digital Assistant having multiple functions, and may be an access point that allows a PAN client connected thereto via the PAN to connect to each of the first network to the N-th network.

Figure 13:
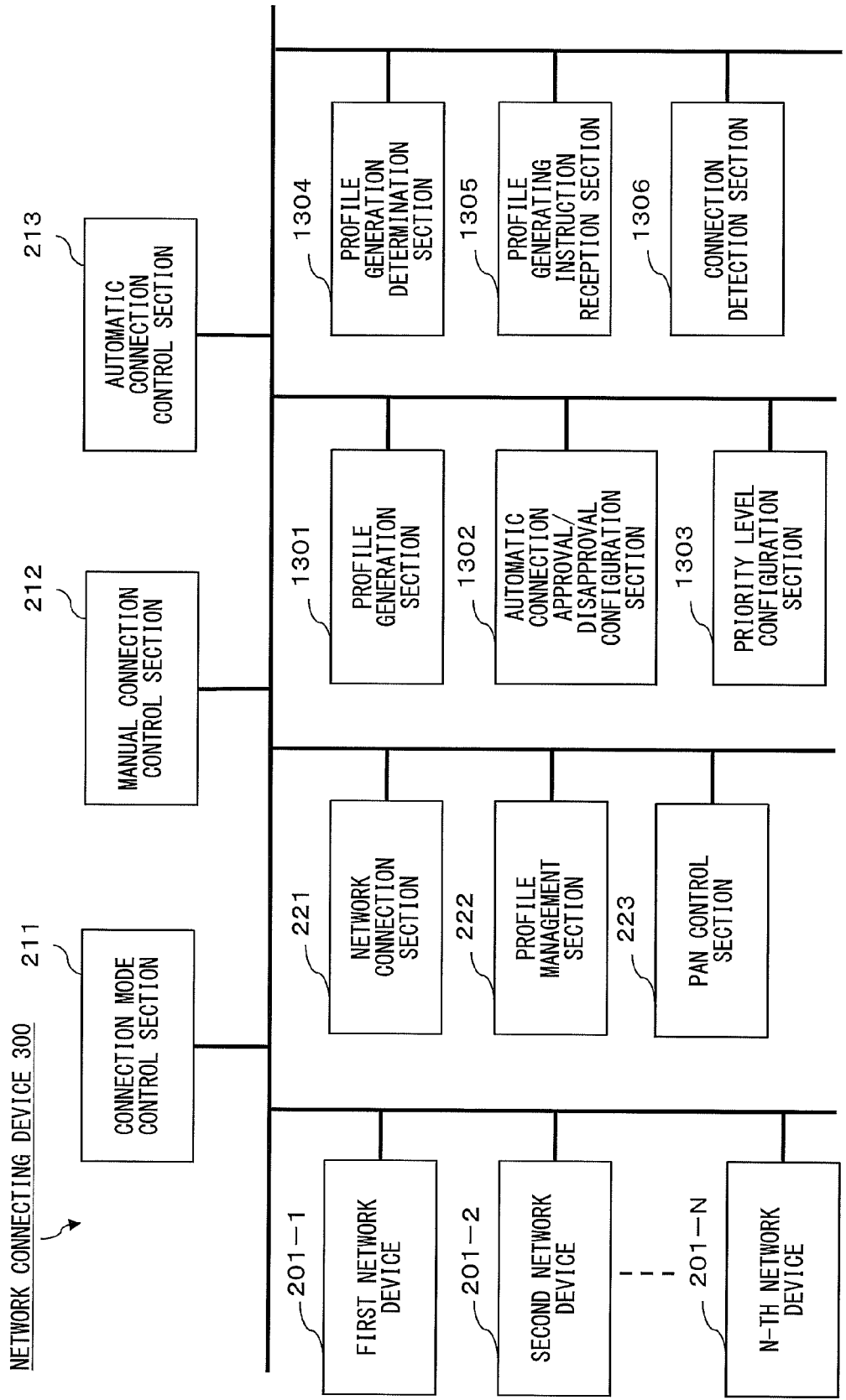
FIG. 13 is a block diagram showing a configuration of a network connecting device according to a third embodiment of the present invention.

FIG. 13 is a functional block diagram showing the network connecting device 300 according to the present embodiment. Components identical to those in the network connecting device 100 are given identical reference characters. In FIG. 13, the network connecting device 300 includes one or more of the network devices 201-1 to 201-N, the connection mode control section 211, the manual connection control section 212, the automatic connection control section 213, the network connection section 221, the profile management section 222, the PAN control section 223, a profile generation section 1301, an automatic connection approval/disapproval configuration section 1302, a priority level configuration section 1303, a profile generation determination section 1304, a profile generating instruction reception section 1305, and a connection detection section 1306.

The network devices 201-1 to 201-N, the connection mode control section 211, the manual connection control section 212, the automatic connection control section 213, the network connection section 221, the profile management section 222, and the PAN control section 223 are identical to those of the first embodiment and descriptions thereof are omitted.

The connection detection section 1306 detects a new network connection that is different from a network connection with which connection is formed based on a profile managed by the profile management section 222. The connection detection section 1306 may store the detected network connection as a connection history. Furthermore, when a new network connection is detected, the connection detection section 1306 notifies the profile generation determination section 1304 about that at a predetermined timing such as when a network connection has been detected for a predetermined number of times or more.

A profile generating instruction can be received from the user. The profile generating instruction reception section 1305 receives a profile generating instruction from the user and notifies it to the profile generation determination section 1304.

The profile generation determination section 1304 determines whether or not to generate a profile including information necessary for forming a connection with the first network to the N-th network. Whether to generate a profile may be determined by the profile generation determination section 1304 based on a notification from the profile generating instruction reception section 1305 or the connection detection section 1306.

For example, when a formation of a network connection using a function included as standard in an OS is detected by the connection detection section 1306, the profile generation determination section 1304 may determine to generate a profile regarding the network connection.

Alternatively, when a new network connection has been detected by the connection detection section 1306 for a predetermined number of times or more, the profile generation determination section 1304 may determine to generate a profile regarding the new network connection. Instead, when a network connection function included as a standard in the OS has a function of confirming whether a profile set up for itself is managed therein, and when the network connection function included as a standard in the OS is managing a profile standard for the OS, the profile generation determination section 1304 may determine to generate a new profile based on the OS standard profile. As a timing to confirm whether the profile standard for the OS is managed by the network connection function included as a standard in the OS, a timing when there is an instruction from the user, a timing when the network connecting device 300 has started up, etc., are conceivable.

The profile generation section 1301 generates a profile when it has been determined by the profile generation determination section 1304 to generate a profile.

When connecting the network connecting device 300 to the first network to the N-th network, the automatic connection approval/disapproval configuration section 1302 determines whether or not to automatically connect the network connecting device 300 to the first network to the N-th network, based on the information necessary for forming the network connection. Then, in accordance with the determination result, the automatic connection approval/disapproval configuration section 1302 configures, in a profile, information indicating whether or not to automatically connect to the network.

For example, the automatic connection approval/disapproval configuration section 1302 may determine whether or not to automatically connect the network connecting device 300 to the first network to the N-th network, based on a predetermined condition regarding security included in the information necessary for forming a network connection with the first network to the N-th network. More specifically, when the network connection is an encrypted network having security strength at a predetermined level or higher, the automatic connection approval/disapproval configuration section 1302 may determine to automatically form the network connection; or when an encryption method that is used has security strength at a predetermined level or higher, the automatic connection approval/disapproval configuration section 1302 may determine to automatically form the network connection.

On the other hand, when an authentication method that is used by the network connection has security strength at a predetermined level or higher, it may be determined not to automatically form the network connection. Furthermore, when a certain amount of communication cost is required for the network connection, it may be determined not to automatically form the network connection.

Then, with regard to the network connection, the automatic connection approval/disapproval configuration section 1302 configures, in a profile, information indicating whether or not to automatically connect to the network in accordance with a determination result regarding whether or not to automatically form a network connection.

When it is determined by the automatic connection approval/disapproval configuration section 1302 to automatically connect the network connecting device 300 to the first network to the N-th network, the priority level configuration section 1303 configures, in a profile, a priority level used for prioritizing among network connections that are to be automatically connected.

For example, the priority level configuration section 1303 may configure the priority levels in accordance with the network type 304. Specifically, by taking into consideration the trustworthiness of the network connections, the priority levels may be configured in sequence for those whose network type 304 is wired LAN, WLAN, WiMAX, and WWAN.

Furthermore, the priority level configuration section 1303 may configure the priority levels in accordance with the number of connections and/or the number of disconnections. Specifically, the priority levels may be configured in sequence from a network with which connection has been formed the most, or the priority levels may be configured in sequence from a network that has been least disconnected. Furthermore, the priority levels may be configured to be low for a network that has been reconnected without being disconnected.

Furthermore, the priority level configuration section 1303 may configure the priority levels in accordance with the communication cost. Specifically, the priority levels may be configured in sequence from a network with a low communication cost.

Furthermore, the priority level configuration section 1303 may configure the priority levels in accordance with communication speed. Specifically, the priority levels may be configured in sequence from a network with high communication speed.

Figure 14:
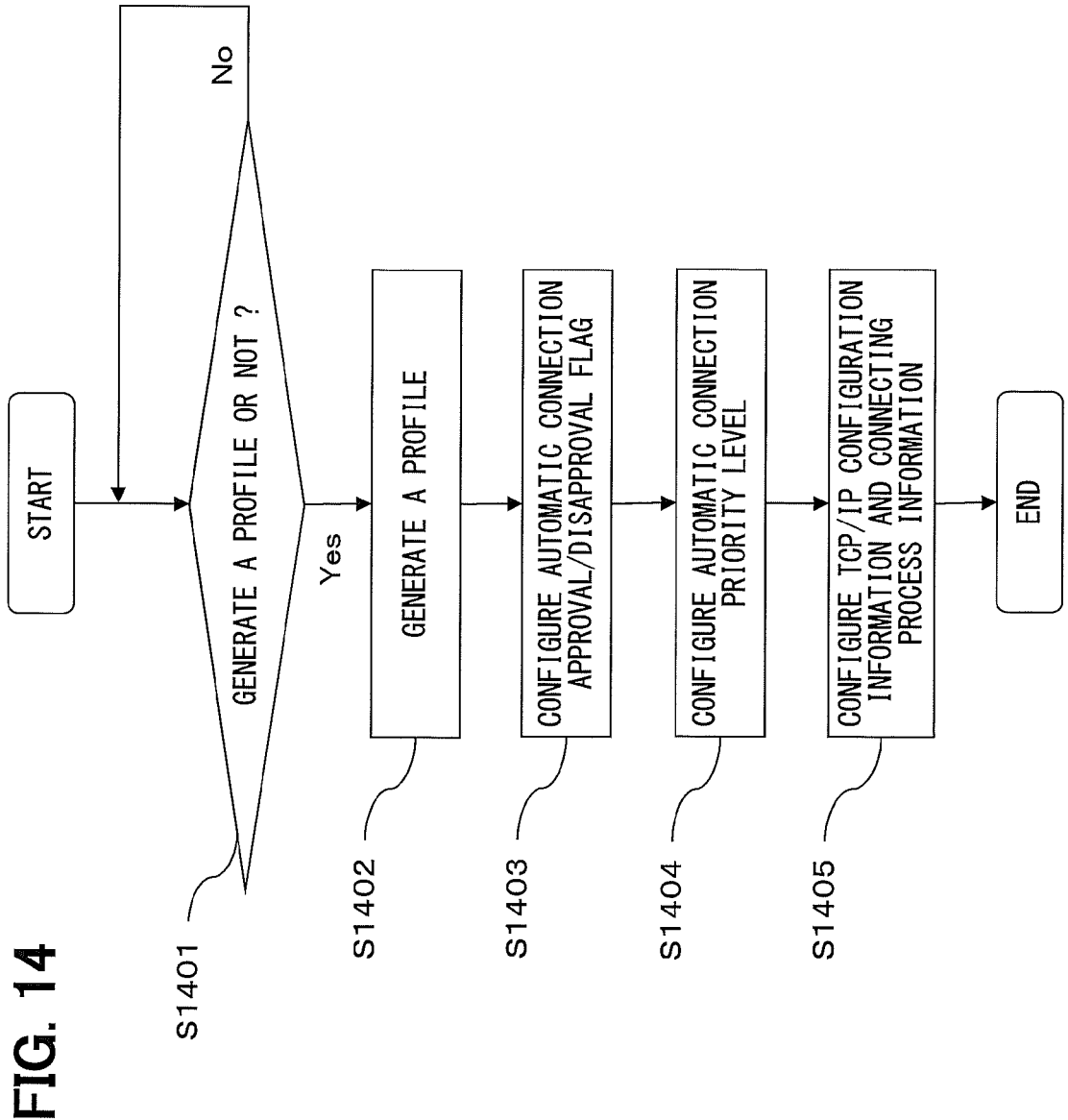
FIG. 14 is a flowchart showing a network connection process in the third embodiment of the present invention.

Next, a flow of processes of a network connecting method executed by the network connecting device 300 will be described in detail. FIG. 14 is a flowchart showing the flow of the processes of the network connecting method.

Step S1401: The profile generation determination section 1304 determines whether or not to generate a profile including information necessary for forming a connection with the first network to the N-th network. Specifically, the profile generation determination section 1304 monitors for a notification from the profile generating instruction reception section 1305 and/or the connection detection section 1306, and determines whether or not to generate a profile.

The profile generation determination section 1304 detects a profile generating instruction when, for example, the profile generating instruction reception section 1305 receives a profile generating instruction given through a user operation, determines to generate a profile, and advances the process to step S1402 (Yes at step S1401).

Furthermore, for example, there are cases where the network connection between the network connecting device 300 and the first network to the N-th network is achieved by using an OS standard network connection function, or by using software and application other than the OS standard network connection function, etc. In such cases, the connection detection section 1306 may detect the network connection formed by using the OS standard network connection function or by using the software and application other than the OS standard network connection function, etc., and the profile generation determination section 1304 may determine to generate a profile using information regarding the network connection, and may advance the process to step S1402 (Yes at step S1401).

Furthermore, in one example, the connection detection section 1306 stores, as a connection history, in storage means such as a memory, information regarding a formed network connection every time a network connection is formed between the network connecting device 300 and the first network to the N-th network. Then, the profile generation determination section 1304 may determine to generate a profile for a network connection formed for a predetermined number of times or more at a predetermined frequency or higher, and may advance the process to step S1402 (Yes at step S1401).

On the other hand, when a profile generating instruction given through a user operation has not been detected, or when a network connection formed for the predetermined number of times or more at the predetermined frequency or higher has not been detected, the profile generation determination section 1304 determines not to generate a profile, repeats the process at step S1101, and continues monitoring for a profile generating instruction (No at step S1401).

Step S1402: The profile generation section 1301 creates a profile. In the following, the profile generated by the profile generation section 1301 will be described in detail.

FIG. 15 shows one example of the profile for forming a network connection between the network connecting device 300 and the first network to the N-th network. Included first in a profile list 1500 shown in FIG. 15 as the information (first network connection information) necessary for forming a network connection between the network connecting device 300 and the first network to the N-th network are: the network type 304, the network device identification information 305, the network identification information 306, and the authentication/encryption information 307. These information are similar to those in the examples of the profiles show in the first embodiment.

For example, with profile A, the network connection is achieved when connection is formed with "WLAN" by a "first network device." Furthermore, when forming the network connection, "authentication method X1, encryption method Y1, and authentication information Z1" are used.

With profile B, the network connection is achieved when connection is formed with "WWAN" by a "second network device." Furthermore, when forming the network connection, "authentication method X2, encryption method Y2, and authentication information Z2" are used.

With profile C, the network connection is achieved when connection is formed with a "wired LAN" by a "third network device." Authentication or encryption is not used with profile C.

With profile D, the network connection is achieved when connection is formed with "WiMAX" by a "fourth network device." Furthermore, when forming the network connection, "authentication method X4, encryption method Y4, and authentication information Z4" are used.

In a similar manner, other profiles are generated by using the network type 304, the network device identification information 305, the network identification information 306, and the authentication/encryption information 307.

The above described first network connection information is acquired from data configured by using the OS standard network connection function or by using the software and application other than the OS standard network connection function etc., and is generated for the profile. In the following steps, based on the first network connection information, the automatic connection approval/disapproval flag 302, the automatic connection priority level 303, the TCP/IP configuration information 308, and the connecting process information 309 are configured (second network connection information). These information are similar to those in the examples of the profiles shown in the first embodiment.

Specifically, when the user forms the network connection using the OS standard network connection function, the first network connection information for the profile shown in FIG. 15 is generated based on connection configuration data of the OS standard function. Furthermore, when the user forms the network connection using the software and application other than the OS standard network connection function etc., the first network connection information for the profile shown in FIG. 15 is generated based on connection configuration data of the software and application.

With this, content configured with the OS standard function that is familiar to the user can be imported into the profile. Furthermore, content configured by various different software can also be converted into the same format and imported into the profile. As a result, management using a single unified interface is enabled.

Step S1403: The automatic connection approval/disapproval configuration section 1302 determines whether the network connecting device 300 may automatically connect to the first network to the N-th network, based on information (first network connection information) necessary for forming the network connection with the profile, and configures the automatic connection approval/disapproval flag 302. When it is determined to allow automatic connection, the automatic connection approval/disapproval configuration section 1302 configures "usage approved" in the automatic connection approval/disapproval flag 302; and when it is determined not to allow automatic connection, the automatic connection approval/disapproval configuration section 1302 configures "usage disapproved" in the automatic connection approval/disapproval flag 302.

Here, whether or not a network connection is allowed to be formed automatically may be determined based on, for example, the authentication/encryption information 307, such that the security strength of the network connection is taken into consideration. Specifically, an encrypted network may be determined as "automatic connection approved," and an un-encrypted network may be determined as "automatic connection disapproved." Furthermore, even with encrypted networks, it is possible to, for example, determine as "automatic connection approved" for encrypted networks having security strength at a predetermined level or higher such as TKIP (Temporal Key Integrity Protocol) and AES (Advanced Encryption Standard), and determine as "automatic connection disapproved" for encrypted networks having security strength less than the predetermined level, such as WEP (Wired Equivalent Privacy) and the like.

Furthermore, it is also possible to, for example, determine as "automatic connection disapproved" for the network when an authentication method having security strength at a predetermined level is used, such as WPA (Wi-Fi Protected Access) 2 Enterprise.

Whether or not to allow a network connection to be formed automatically can be determined, for example, by taking into consideration the communication cost generated when forming the network connection. Specifically, when forming the network connection, it is possible to determine as "automatic connection disapproved" if a communication cost is generated, or if a communication cost equal to or more than a predetermined amount of money is generated. Furthermore, in such a case, it is possible have a semi-automatic connection, by making a request with the user regarding a confirmation of whether to form the network connection, and then forming the network connection.

Whether or not to allow a network connection to be formed automatically can be determined, for example, by taking into consideration the network type 304 of the network. Specifically, it is possible to determine as "automatic connection approved" when the network type 304 of the network is wired LAN, and determine as "automatic connection disapproved" for other network types. Furthermore, in such a case, it is possible to have a semi-automatic connection, by making a request with the user regarding a confirmation of whether to form the network connection, and then forming the network connection.

In such manner, safety can be ensured with regard to network connection by determining as "automatic connection approved" only for a network connection having security strength at a predetermined level, or determining as "automatic connection approved" only for a network connection of a specific network type 304.

Step S1404: The priority level configuration section 1303 configures priority levels used for prioritizing connections to be formed, for network connections determined as "automatic connection approved" at step S1403.

Here, the priority levels may be configured based on, for example, the network type 304 such that trustworthiness of a network connection is taken into consideration. Specifically, the priority levels may be configured in sequence as wired LAN, WLAN, WiMAX, and WWAN.

Furthermore, in one example, the connection detection section 1306 stores, as a connection history, in storage means such as a memory, information regarding a formed network connection every time a network connection is formed between the network connecting device 300 and the first network to the N-th network. Then, by referring to the connection history, the priority levels may be configured in sequence from a network with which connection has been formed the most, or the priority levels may be configured in sequence from a network that has been least disconnected. Furthermore, the priority levels may be configured to be low for a network that has been reconnected without being disconnected.

Furthermore, for example, the priority levels may be configured in sequence from a network with a low communication cost, or the priority levels may be configured in sequence from a network with high communication speed.

Furthermore, the priority levels may be determined comprehensively using a combination of some or all of: trustworthiness, connection history, communication cost, and communication speed of the network connection. For example, it is possible to have the priority level to be configurable or changeable so as to respond to a situation such as when the user wishes to prioritize communication speed over communication cost.

A network connection in accordance with the user's purpose of usage can be achieved by configuring the priority levels while taking into consideration trustworthiness, usage status such as connection/disconnection frequency, communication cost, and communication speed of a network connection.

Step S1405: The profile generation section 1301 configures the TCP/IP configuration information 308 and the connecting process information 309 of each profile. Specifically, the profile generation section 1301 automatically acquires various current configurations for the network connecting device 200, connection configuration data of the OS standard function, and the like; and configures the connection configuration data as extended information necessary for a process to be conducted upon connection. For example, current configurations for the OS and web browser, and specific network configurations defined when a network connection is formed, such as current configurations for the IP address of the network connecting device 200, the default gateway, and the proxy server are acquired; and they are configured in the connecting process information 309 and the TCP/IP configuration information 308 of the profile as the extended information. It is also possible to save as an operation history a configuration used when connection was formed with the network in the past, and, based on the operation history, configure a well-suited content such as, for example, to have a configuration for automatically executing an operation that has been conducted most frequently. Furthermore, a predetermined content can be configured for each network type. For example, as the TCP/IP configuration, it is possible to use DHCP configuration for WLAN, WWAN, and WiMAX, and to acquire and use the current configuration of the OS for wired LAN.

In FIG. 15, for example, starting up application W1 is defined as the connecting process information 309 in profile A. In other words, application W1 is started up when connection is formed with WLAN by the first network device 201-1 and when a network connection with the first network is achieved. In addition, "IP address: 192.168.1.1, subnet mask: 255.255.0.0" is configured as the TCP/IP configuration information 308.

In profile B, starting up application W2 and displaying screen U2 are defined as the connecting process information 309. In other words, application W2 is started up and screen U2 is displayed when connection is formed with WWAN by the second network device 201-2 and when a network connection with the second network is achieved. In addition, "IP address: 192.168.2.2, subnet mask: 255.255.0.0" is configured as the TCP/IP configuration information 308.

In profile C, starting up application W3 and displaying screen U3 are defined as the connecting process information 309. In other words, application W3 is started up and screen U3 is displayed when connection is formed with a wired LAN by the third network device 201-3 and when a network connection with the third network is achieved. In addition, "IP address: 192.168.3.3, subnet mask: 255.255.0.0" is configured as the TCP/IP configuration information 308.

In profile D, starting up application W4 is defined as the connecting process information 309. In other words, application W4 is started up when connection is formed with WiMAX by the fourth network device 201-4 and when a network connection with the fourth network is achieved. However, since the automatic connection approval/disapproval flag 302 is "usage disapproved" in profile D, application W4 is started up when, for example, connection to the fourth network is manually achieved (through execution of authentication etc.). In addition, "IP address: 192.168.4.4, subnet mask: 255.255.0.0" is configured as the TCP/IP configuration information 308.

Here, although starting up of an application and displaying of a screen are defined as the connecting process information 309, the connecting process information 309 is not limited thereto and may include a proxy server configuration, a default printer configuration, a VPN automatic start-up configuration, a configuration regarding a home page displayed upon startup of a web browser, and the like.

In the manner described above, as a result of defining the TCP/IP configuration information and the connecting process information for every profile, specific network configurations and applications, which are started up in accordance with the network type, the authentication/encryption information 307, etc., are executed in association with achieving of a network connection; and thereby convenience for the user can be improved since it is unnecessary for the user to operate the network connection, and manipulate specific network configuration and start-up applications, separately.

As described above, according to the present embodiment, the user can easily obtain a safe network connection with a use of a single unified interface connectable to different types of networks, even for a user who has become familiar with OS standard functions.

While embodiments of the present invention have been described, it is needless to say that the present invention is not limit to the embodiments described above. Those described in the following are also included in the present invention.

(1) Each of the devices described above is, more specifically, a computer system including a microprocessor, a ROM (read-only memory), a RAM (random-access memory), a hard disk unit, a display unit, a keyboard, a mouse, and the like. A computer program is stored on the RAM or the hard disk unit. Functions of the above described components are achieved when the microprocessor operates in accordance with the computer program. Here, the computer program is formed as a combination of multiple instruction codes indicating instructions for the computer to achieve predetermined functions.

(2) Some or all the components included in each of the devices described above may be formed from a single system LSI (Large Scale Integration). The system LSI is a super-multifunctional LSI manufactured by integrating multiple component sections on a single chip, and, more specifically, is a computer system including a microprocessor, a ROM, a RAM, and the like. A computer program is stored on the RAM. Functions of the system LSI are achieved when the microprocessor operates in accordance with the computer program.

(3) Some or all the components included in each of the devices described above may be formed from an IC card or a stand-alone module that is detachable from the devices. The IC card or module is a computer system including a microprocessor, a ROM, a RAM, and the like. The IC card or module may include the above described super-multifunctional LSI. Functions of the IC card or module are achieved when the microprocessor operates in accordance with the computer program. The IC card or module may be tamper resistant.

(4) The present invention may be methods executed by the devices described above. Furthermore, the present invention may be a computer program that achieves these methods in a computer, or may be digital signals including a computer program.

Furthermore, the present invention may be realized as a computer-readable storage medium having stored thereon a computer program or digital signals. Examples of the computer-readable storage medium may include, for example, a flexible disk, a hard disk, a compact read-only disk (CD-ROM), a magnetic optical disk (MO), a DVD-ROM, a DVD-RAM, a BD (Blu-ray Disc) (Registered Trademark), a semiconductor memory, and the like. Furthermore, the present invention may be digital signals stored on any one of those storage media.

Furthermore, the present invention may be one that transmits a computer program or the digital signals via an electric telecommunication line, a wireless or wired communication line, a network represented by the Internet, data broadcasting, and the like.

Furthermore, the present invention may be a computer system including a microprocessor and a memory, wherein the memory stores the above described computer program, and the microprocessor operates in accordance with the computer program.

Furthermore, the present invention may be implemented by having a program or digital signals stored on a storage medium and transported, or by having a program or digital signals transported via a network or the like, so as to be executed on another independent computer system.

(5) The above described embodiments and modifications may be combined with another. For example, it is possible to combine the first embodiment and the third embodiment, and conduct the creation of a profile in a mode shown in the third embodiment and form a network connection in a mode shown in the first embodiment. Furthermore, it is possible to combine the second embodiment and the third embodiment, and conduct the creation of a profile in a mode shown in the third embodiment and form a network connection in a mode shown in the second embodiment.

The network connecting devices and methods of the present invention are useful in terminals that are connectable to various networks.

What is claimed is:

1. A network connecting device for making wireless or wired connection to wide-area networks (WANs) or local-area networks (LANs) via a WAN or LAN network control device, the network connecting device comprising:
   a client-terminal—connecting-device personal area network-forming device;
   a LAN connector; and
   a microprocessor programmed to function as
      a wired LAN connection detection section detecting connecting of a LAN cable to the LAN connector;
      a profile management section storing and managing profiles including information necessary for forming a connection with a WAN or LAN;
      a profile selection section selecting, in sequence from among the profiles managed by the profile management section, at least one profile that indicates wired LAN connection, when LAN-cable connection to the LAN connector is detected by the wired LAN connection detection section;
      a network configuration section setting, based on the at least one wired-LAN connection-indicating profile selected by the profile selection section, a LAN configuration corresponding to the profile;
      a network identification information acquisition section making a request with a LAN to which the network connecting device is LAN-cable connected, regarding network identification information for identifying the LAN, and acquiring the LAN identification information, based on the LAN configuration set by the network configuration section;

a network determination section determining, based on the LAN identification information acquired by the network identification information acquisition section and on information included in the at least one wired-LAN connection-indicating profile selected by the profile selection section, whether a wired LAN with which connection is LAN-cable formed and the LAN configuration set by the network configuration section match each other; and a network connection section applying, when the network determination section determines that a wired LAN with which connection is LAN-cable formed and the LAN configuration set by the network configuration section match each other, the at least one wired-LAN connection-indicating profile selected by the profile selection section, controlling the network-forming device based on the profile, and connecting to the LAN via a LAN network control device; wherein if identification information of the LAN control device for achieving the LAN connection is not set in the at least one wired-LAN connection-indicating profile, the network determination section determines whether an IP (Internet Protocol) address of the network connecting device is within a range acquirable with DHCP (Dynamic Host Configuration Protocol).

2. The network connecting device according to claim 1, wherein:

the profile includes the identification information of the LAN control device for achieving the LAN connection;

the network identification information acquisition section acquires the identification information of the LAN control device for the LAN to which the network connecting device is LAN-cable connected, based on the LAN configuration set by the network configuration section; and the network determination section determines whether the identification information acquired by the network identification information acquisition section and the identification information of the LAN control device included in the at least one wired-LAN connection-indicating profile selected by the profile selection section match each other.

3. The network connecting device according to claim 2, wherein the identification information of the control device is a MAC (Media Access Control) address.

4. The network connecting device according to claim 3, wherein the network identification information acquisition section acquires, by using ARP (Address Resolution Protocol), a MAC address of the control device in the LAN to which the network connecting device is LAN-cable connected, based on the network configuration set by the network configuration section.

5. The network connecting device according to claim 2, wherein the control device is a router.

6. The network connecting device according to claim 2, wherein the control device is a default gateway.

7. The network connecting device according to claim 1, wherein the network identification information acquisition section acquires, by using RIP (Routing Information Protocol), the network identification information for identifying the network.

8. The network connecting device according to claim 1, wherein, from among the at least one wired-LAN connection-indicating profile, the profile selection section selects, in sequence based on a priority level indicating priority for connection-network searching conducted by the network connection section, a profile indicating wired LAN connection.

9. A network connecting device for making wireless or wired connection to wide-area networks (WANs) or local-area networks (LANs), the network connecting device comprising:

a client-terminal—connecting-device personal area network-forming device;

a LAN connector; and a microprocessor programmed to function as a wired LAN connection detection section detecting connecting of a LAN cable to the LAN connector;

a profile management section storing and managing profiles including information necessary for forming a connection with a WAN or LAN;

a profile selection section selecting, in sequence from among the profiles managed by the profile management section, at least one profile that indicates wired LAN connection, when LAN-cable connection to the LAN connector is detected by the wired LAN connection detection section;

a network configuration section setting, based on the at least one wired-LAN connection-indicating profile selected by the profile selection section, a LAN configuration corresponding to the profile;

a network identification information acquisition section making a request with a LAN network to which the network connecting device is LAN-cable connected, regarding network identification information for identifying the LAN, and acquiring the LAN identification information, based on the LAN configuration set by the network configuration section;

a network determination section determining, based on the LAN identification information acquired by the network identification information acquisition section and on information included in the at least one wired-LAN connection-indicating profile selected by the profile selection section, whether a wired LAN with which connection is LAN-cable formed and the LAN configuration set by the network configuration section match each other; and a network connection section applying, when the network determination section determines that a wired LAN with which connection is LAN-cable formed and the LAN configuration set by the network configuration section match each other, the at least one wired-LAN connection-indicating profile selected by the profile selection section, controlling the network-forming device based on the profile, and connecting to the LAN; wherein from among the at least one wired-LAN connection-indicating profile, the profile selection section selects, in sequence based on a priority level indicating priority for connection-network searching conducted by the network connection section, a profile indicating wired LAN connection, and the connection-network searching priority level is set in accordance with at least one of either a connection count or a disconnection count for a wired LAN connection corresponding to the at least one wired-LAN connection-indicating profile.

10. A network connecting device for making wireless or wired connection to wide-area networks (WANs) or local-area networks (LANs), the network connecting device comprising:

a client-terminal—connecting-device personal area network-forming device;

a LAN connector; and a microprocessor programmed to function as a wired LAN connection detection section detecting connecting of a LAN cable to the LAN connector;

a profile management section storing and managing profiles including information necessary for forming a connection with a WAN or LAN;

a profile selection section selecting, in sequence from among the profiles managed by the profile management section, at least one profile that indicates wired LAN connection, when LAN-cable connection to the LAN connector is detected by the wired LAN connection detection section;

a network configuration section setting, based on the at least one wired-LAN connection-indicating profile selected by the profile selection section, a LAN configuration corresponding to the profile;

a network identification information acquisition section making a request with a LAN network to which the network connecting device is LAN-cable connected, regarding network identification information for identifying the LAN, and acquiring the LAN identification information, based on the LAN configuration set by the network configuration section;

a network determination section determining, based on the LAN identification information acquired by the network identification information acquisition section and on information included in the at least one wired-LAN connection-indicating profile selected by the profile selection section, whether a wired LAN with which connection is LAN-cable formed and the LAN configuration set by the network configuration section match each other; and a network connection section applying, when the network determination section determines that a wired LAN with which connection is LAN-cable formed and the LAN configuration set by the network configuration section match each other, the at least one wired-LAN connection-indicating profile selected by the profile selection section, controlling the network-forming device based on the profile, and connecting to the LAN; wherein the network identification information acquisition section stops, as a timeout, the acquiring of the network identification information after elapsing of a predetermined time period; and if it is determined by the network determination section that a wired LAN with which connection is LAN-cable formed does not match any LAN configuration set by the network configuration section based on the at least one wired-LAN connection indicating profile, the profile selection section re-selects in sequence the at least one wired-LAN connection indicating profile, and the network identification information acquisition section re-acquires the network identification information, in accordance with a network configuration set by the network configuration section based on the re-selected profile, and implements the timeout after elapse of a period longer than the predetermined time period.

11. A network connecting device for making wireless or wired connection to wide-area networks (WANs) or local-area networks (LANs), the network connecting device comprising:

a client-terminal—connecting-device personal area network-forming device;

a LAN connector; and a microprocessor programmed to function as a wired LAN connection detection section detecting connecting of a LAN cable to the LAN connector;

a profile management section storing and managing profiles including information necessary for forming a connection with a WAN or LAN;

a profile selection section selecting, in sequence from among the profiles managed by the profile management section, at least one profile that indicates wired LAN connection, when LAN-cable connection to the LAN connector is detected by the wired LAN connection detection section;

a network configuration section setting, based on the at least one wired-LAN connection-indicating profile selected by the profile selection section, a LAN configuration corresponding to the profile;

a network identification information acquisition section making a request with a LAN network to which the network connecting device is LAN-cable connected, regarding network identification information for identifying the LAN, and acquiring the LAN identification information, based on the LAN configuration set by the network configuration section;

a network determination section determining, based on the LAN identification information acquired by the network identification information acquisition section and on information included in the at least one wired-LAN connection-indicating profile selected by the profile selection section, whether a wired LAN with which connection is LAN-cable formed and the LAN configuration set by the network configuration section match each other; and a network connection section applying, when the network determination section determines that a wired LAN with which connection is LAN-cable formed and the LAN configuration set by the network configuration section match each other, the at least one wired-LAN connection-indicating profile selected by the profile selection section, controlling the network-forming device based on the profile, and connecting to the LAN;

a connection approval/disapproval determination rule management section configured to manage a connection approval/disapproval determination rule for determining approval/disapproval of connection to the LAN using the at least one wired-LAN connection-indicating profile;

a connection approval/disapproval determination section configured to determine approval/disapproval of connection to the LAN using the at least one wired-LAN connection-indicating profile, in accordance with the connection approval/disapproval determination rule managed by the connection approval/disapproval determination rule management section;

a network connection control section configured to control the connection to the LAN, make an inquiry with the connection approval/disapproval determination section regarding approval/disapproval of connection to the LAN using the at least one wired-LAN connection-indicating profile, and instruct the network connection section to connect to the LAN when a determination result obtained from the connection approval/disapproval determination section is "connection approved"; and a security measure process execution section configured to implement a predetermined security measure process when the predetermined security measure process is necessary for satisfying a condition, managed by the connection approval/disapproval determination rule management section, used by the connection approval/disapproval determination section to make the determination "connection approved".

12. A network connecting method executed by a computer including a processor and a local-area network (LAN) connector, the method comprising:
   a wired LAN connection detection step of causing the computer to detect connection of a LAN cable to the LAN connector;
   a profile selection step of causing the computer to select, in sequence from among profiles included in pre-stored information necessary to form a connection with a network, at least one profile that indicates wired LAN connection;
   a network configuration step of causing the computer to set, based on the at least one wired-LAN connection-indicating profile selected in the profile selection step, a LAN configuration corresponding to the profile;
   a network identification information acquisition step of causing the computer to make a request with a LAN to which the computer is LAN-cable connected, regarding network identification information for identifying the LAN, and acquire the LAN identification information, based on the LAN configuration set in the network configuration step;
   a network determination step of causing the computer to determine, based on the LAN identification information acquired in the network identification information acquisition step and information included in the at least one wired-LAN connection-indicating profile selected in the profile selection step, whether a wired LAN with which connection is LAN-cable formed and the LAN configuration set in the network configuration step match each other;
   a network connection step of causing the computer to apply, when a wired LAN with which connection is LAN-cable formed and the LAN configuration set in the network configuration step are determined to match each other in the network determination step, the at least one wired-LAN connection-indicating profile selected in the profile selection step, control a network-forming device based on the profile, and connect to the LAN via a LAN network control device; wherein
   if identification information of the LAN control device for achieving the LAN connection is not set in the at least one wired-LAN connection-indicating profile, the network determination step determines whether an IP (Internet Protocol) address of the network connecting device is within a range acquirable with DHCP (Dynamic Host Configuration Protocol).

13. A network connecting method executed by a computer including a processor and a local-area network (LAN) connector, the method comprising:
   a wired LAN connection detection step of causing the computer to detect connection of a LAN cable to the LAN connector;
   a profile selection step of causing the computer to select, in sequence from among profiles included in pre-stored information necessary to form a connection with a network, at least one profile that indicates wired LAN connection, and from among the at least one wired-LAN connection-indicating profile, selecting, in sequence based on a priority level indicating priority for connection-network searching, a profile indicating wired LAN connection;
   a network configuration step of causing the computer to set, based on the at least one wired-LAN connection-indicating profile selected in the profile selection step, a LAN configuration corresponding to the profile;
   a network identification information acquisition step of causing the computer to make a request with a LAN to which the computer is LAN-cable connected, regarding network identification information for identifying the LAN, and acquire the LAN identification information, based on the LAN configuration set in the network configuration step;
   a network determination step of causing the computer to determine, based on the LAN identification information acquired in the network identification information acquisition step and on information included in the at least one wired-LAN connection-indicating profile selected in the profile selection step, whether a wired LAN with which connection is LAN-cable formed and the LAN configuration set by in the network configuration step match each other; and
   a network connection step of causing the computer to apply, when a wired LAN with which connection is LAN-cable formed and the LAN configuration set in the network configuration step are determined to match each other in the network determination step, the at least one wired-LAN connection-indicating profile selected in the profile selection step, control a network-forming device based on the profile, and connect to the LAN; wherein
   the connection-network searching priority level is set in accordance with at least one of either a connection count or a disconnection count for a wired LAN connection corresponding to the at least one wired-LAN connection-indicating profile.

14. A network connecting method executed by a computer including a processor and a local-area network (LAN) connector, the method comprising:
   a wired LAN connection detection step of causing the computer to detect connection of a LAN cable to the LAN connector;
   a profile selection step of causing the computer to select, in sequence from among profiles included in pre-stored information necessary to form a connection with a network, at least one profile that indicates wired LAN connection;
   a network configuration step of causing the computer to set, based on the the at least one wired-LAN connection-indicating profile selected in the profile selection step, a LAN configuration corresponding to the profile;
   a network identification information acquisition step of causing the computer to make a request with a LAN to which the computer is LAN-cable connected, regarding network identification information for identifying the LAN, and acquire the LAN identification information, based on the LAN configuration set in the network configuration step;
   a network determination step of causing the computer to determine, based on the LAN identification information acquired in the network identification information acquisition step and on information included in the at least one wired-LAN connection-indicating profile selected in the profile selection step, whether a wired LAN with which connection is LAN-cable formed and the LAN configuration set in the network configuration step match each other; and
   a network connection step of causing the computer to apply, when a wired LAN with which connection is LAN-cable formed and the LAN configuration set in the network configuration step are determined to match each other in the network determination step, the at least one wired-LAN connection-indicating profile selected in the profile selection step, control a network-forming device based on the profile, and connect to the LAN; wherein the network identification information acquisition step stops, as a timeout, the acquiring of the network identification information after elapsing of a predetermined time period; and if it is determined by the network determination step that a wired LAN with which connection is LAN-cable formed does not match any LAN configuration set in the network configuration step based on the at least one wired-LAN connection-indicating profile, the profile selection step re-selects in sequence the at least one wired-LAN connection-indicating profile, and the network identification information acquisition step re-acquires the network identification information, in accordance with a network configuration set in the network configuration step based on the re-selected profile, and implements the timeout after elapse of a period longer than the predetermined time period.

15. A network connecting method executed by a computer including a processor and a local-area network (LAN) connector, the method comprising:

a wired LAN connection detection step of causing the computer to detect connection of a LAN cable to the LAN connector;

a profile selection step of causing the computer to select, in sequence from among profiles included in pre-stored information necessary to form a connection with a network, at least one profile that indicates wired LAN connection;

a network configuration step of causing the computer to set, based on the at least one wired-LAN connection-indicating profile selected in the profile selection step, a LAN configuration corresponding to the profile;

a network identification information acquisition step of causing the computer to make a request with a LAN to which the computer is LAN-cable connected, regarding network identification information for identifying the LAN, and acquire the LAN identification information, based on the LAN configuration set in the network configuration step;

a network determination step of causing the computer to determine, based on the LAN identification information acquired in the network identification information acquisition step and on information included in the at least one wired-LAN connection-indicating profile selected in the profile selection step, whether a wired LAN with which connection is LAN-cable formed and the LAN configuration set in the network configuration step match each other;

a network connection step of causing the computer to apply, when a wired LAN with which connection is LAN-cable formed and the LAN configuration set in the network configuration step are determined to match each other in the network determination step, the at least one wired-LAN connection-indicating profile selected in the profile selection step, control a network-forming device based on the profile, and connect to the LAN;

a connection approval/disapproval determination rule management step of causing the computer to manage a connection approval/disapproval determination rule for determining approval/disapproval of connection to the LAN using the at least one wired-LAN connection-indicating profile;

a connection approval/disapproval determination step of causing the computer to determine approval/disapproval of connection to the LAN using the at least one wired-LAN connection-indicating profile, in accordance with the connection approval/disapproval determination rule managed by the connection approval/disapproval determination rule management step;

a network connection control step of causing the computer to control the connection to the LAN, make an inquiry regarding approval/disapproval of connection to the LAN using the at least one wired-LAN connection-indicating profile, and instruct connection to the LAN when a determination result obtained through the connection approval/disapproval determination by is "connection approved"; and a security measure process execution step of causing the computer to implement a predetermined security measure process when the predetermined security measure process is necessary for satisfying a condition, managed by the connection approval/disapproval determination rule management step, used by the connection approval/disapproval determination step to make the determination "connection approved."

* * * * *